(12) United States Patent
Fujikawa

(10) Patent No.: US 11,840,306 B2
(45) Date of Patent: Dec. 12, 2023

(54) VALVE DEVICE AND VEHICLE HEIGHT ADJUSTING DEVICE EQUIPPED WITH VALVE DEVICE

(71) Applicant: Hitachi Astemo, Ltd., Hitachinaka (JP)

(72) Inventor: Yosuke Fujikawa, Hitachinaka (JP)

(73) Assignee: Hitachi Astero, Ltd., Hitachinaka (JP)

( * ) Notice: Subject to any disclaimer, the term of this patent is extended or adjusted under 35 U.S.C. 154(b) by 0 days.

(21) Appl. No.: 17/694,175

(22) Filed: Mar. 14, 2022

(65) Prior Publication Data

US 2022/0194512 A1  Jun. 23, 2022

Related U.S. Application Data

(63) Continuation of application No. PCT/JP2020/025261, filed on Jun. 26, 2020.

(51) Int. Cl.
*F16K 31/06* (2006.01)
*B62K 25/00* (2006.01)
(Continued)

(52) U.S. Cl.
CPC ............ *B62K 25/00* (2013.01); *F16K 11/161* (2013.01); *F16K 31/06* (2013.01);
(Continued)

(58) Field of Classification Search
CPC ... F16K 11/161; F16K 31/0655; F16K 15/044
See application file for complete search history.

(56) References Cited

U.S. PATENT DOCUMENTS

| 1,365,931 | A | * | 1/1921 | Martin | F16K 11/161 |
| | | | | | 137/307 |
| 1,967,418 | A | * | 7/1934 | Mcphail | F16K 15/12 |
| | | | | | 137/516.21 |

(Continued)

FOREIGN PATENT DOCUMENTS

JP  6496089 B1  2/2020

OTHER PUBLICATIONS

International Search Report dated Jul. 28, 2020 for the corresponding International Patent Application No. PCT/JP2020/025261, 5 pages [English translation attached].

(Continued)

*Primary Examiner* — Umashankar Venkatesan
(74) *Attorney, Agent, or Firm* — Leason Ellis LLP; Edward J. Ellis; Melvin C. Garner

(57) ABSTRACT

A valve device includes an operating portion including an operating rod switchable between a first state where the operating rod is at a first position, a second state where the operating rod is displaced from the first position, and a third state where the operating rod is displaced from the first position, a push member that can advance by being pushed by the operating rod, a first valve that can be opened and closed in accordance with the amount of displacement of the operating rod and the push member from the first position, a housing storing the first valve, and a second valve that can open and close a communication passage allowing communication inside and outside the housing by switching operation of the operating rod so as to switch from the first state to the second state.

9 Claims, 13 Drawing Sheets

(51) Int. Cl.
*F16K 31/44* (2006.01)
*F16K 11/16* (2006.01)
(52) U.S. Cl.
CPC .......... *F16K 31/0655* (2013.01); *F16K 31/44* (2013.01); *F16K 2200/30* (2021.08); *F16K 2200/302* (2021.08)

(56) References Cited

U.S. PATENT DOCUMENTS

| | | | | |
|---|---|---|---|---|
| 2,250,752 | A * | 7/1941 | Dayton | F01L 1/245 123/90.59 |
| 2,983,286 | A * | 5/1961 | Greenawalt | F16K 31/40 251/30.03 |
| 2,991,799 | A * | 7/1961 | Littlefield | F16K 31/06 335/265 |
| 5,211,341 | A * | 5/1993 | Wieczorek | F02M 51/0685 239/900 |
| 11,216,018 | B2 * | 1/2022 | Murakami | F16K 31/0665 |
| 2016/0272271 | A1 * | 9/2016 | Murakami | B60G 15/02 |
| 2019/0219126 | A1 * | 7/2019 | Miwa | F16F 9/464 |
| 2021/0041899 | A1 | 2/2021 | Murakami et al. | |

OTHER PUBLICATIONS

International Written Opinion dated Jul. 28, 2020 for the corresponding International Patent Application No. PCT/JP2020/025261, 3 pages.

\* cited by examiner

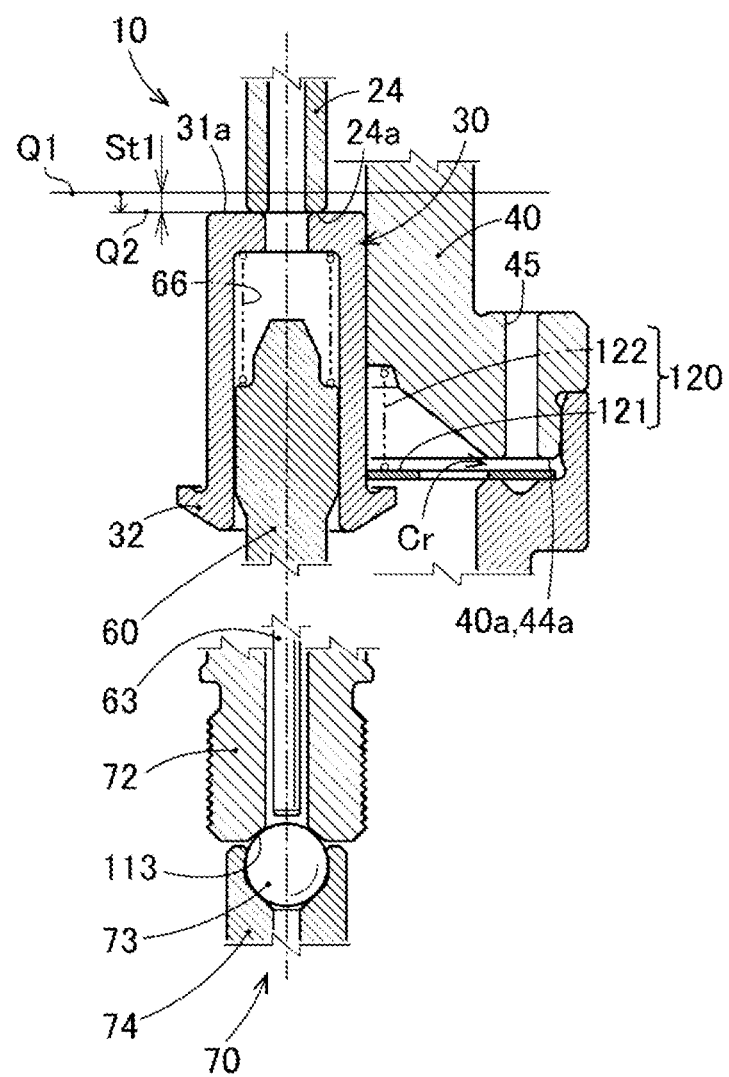

VALVE DEVICE AND VEHICLE HEIGHT ADJUSTING DEVICE EQUIPPED WITH VALVE DEVICE

CROSS-REFERENCE TO RELATED APPLICATION

This application is a Continuation of International Application No. PCT/JP2020/025261, which was filed on Jun. 26, 2020, the content of which is incorporated herein by reference in its entirety.

FIELD OF THE INVENTION

The present invention relates to a valve device that can be opened and closed by an operating portion including an operating rod capable of moving forward and backward and a vehicle height adjusting device equipped with the valve device and suitable for use in a saddle-riding type vehicle.

BACKGROUND OF THE INVENTION

A valve device that can be opened and closed by an operating rod of an operating portion of an electromagnetic actuator or the like moving forward and backward is known in, for example, JP-B-6496089.

The valve device known in Patent Literature 1 includes an operating portion including an operating rod capable of moving forward and backward, a push member capable of advancing by the same amount of forward and backward movement and in the same direction as the operating rod by being pushed by the operating rod, a valve capable of being opened and closed in accordance with the forward and backward movement operation of the push member, and a housing storing the valve.

CITATION LIST

Patent Literature

Patent Literature 1: JP-B-6496089

Technical Problem

The valve device known in JP-B-6496089 can be used for various applications. In some cases, the air that is generated in a main device equipped with the valve device may accumulate in the housing of the valve device. In other words, a so-called air accumulation phenomenon may occur.

Conceivable as an example is a configuration in which a vehicle height adjusting device for a saddle-riding type vehicle such as a motorcycle is equipped with the valve device. The vehicle height adjusting device increases the height of a vehicle while the vehicle travels, decreases the vehicle height for boarding and alighting facilitation while the vehicle is stopped, and is used as a front fork shock absorber. In this case, the shock absorber can be mounted on the saddle-riding type vehicle in a substantially vertical state such that a pump is positioned below the valve device. Such a vehicle height adjusting device changes the height of a vehicle by, for example, pressurizing and/or depressurizing the inside of an oil chamber.

The minute air that is contained in oil may be gradually separated and accumulated in the upper portion of the pump or in the housing of the valve device. It is preferable to remove the accumulated air in order to ensure a sufficient pump performance. In this regard, it is conceivable to add a separate valve for releasing the air that is accumulated in the housing of the valve device and an operating portion driving the valve. However, this results in an increase in complexity in terms of valve device configuration and there is room for improvement.

An object of the present invention is to provide a valve device or the like capable of improving an air accumulation phenomenon.

SUMMARY OF THE INVENTION

Solution to Problem

As a result of diligent studies, the present inventor has found that it is possible to provide a valve device that improves an air accumulation phenomenon in a housing, by providing a second valve for opening and closing the housing in and out where a first valve of the valve device is stored and also opening and closing the second valve with an operating portion driving the first valve. The present invention has been completed based on this finding.

Hereinafter, the present disclosure will be described.

Provided according to an aspect of the present disclosure is a valve device including: an operating portion including an operating rod switchable between a first state where the operating rod is at a first position where the operating rod is retracted most, a second state where the operating rod is displaced from the first position by a preset first forward and backward movement amount, and a third state where the operating rod is displaced by a second forward and backward movement amount larger than the first forward and backward movement amount; a push member that can advance by the same amount of forward and backward movement and in the same direction as the operating rod by being pushed by the operating rod; a first valve that can be opened and closed in accordance with the amount of displacement of the operating rod and the push member from the first position; a housing that stores the first valve; and a second valve that can open and close a communication passage allowing communication inside and outside the housing by switching operation of the operating rod so as to switch between the first state and the second state.

Advantageous Effects of Invention

It is possible to provide a valve device or the like capable of improving an air accumulation phenomenon.

BRIEF DESCRIPTION OF THE DRAWINGS

FIG. 2B is a diagram illustrating a second state.

DETAILED DESCRIPTION OF THE INVENTION

Figure 1:
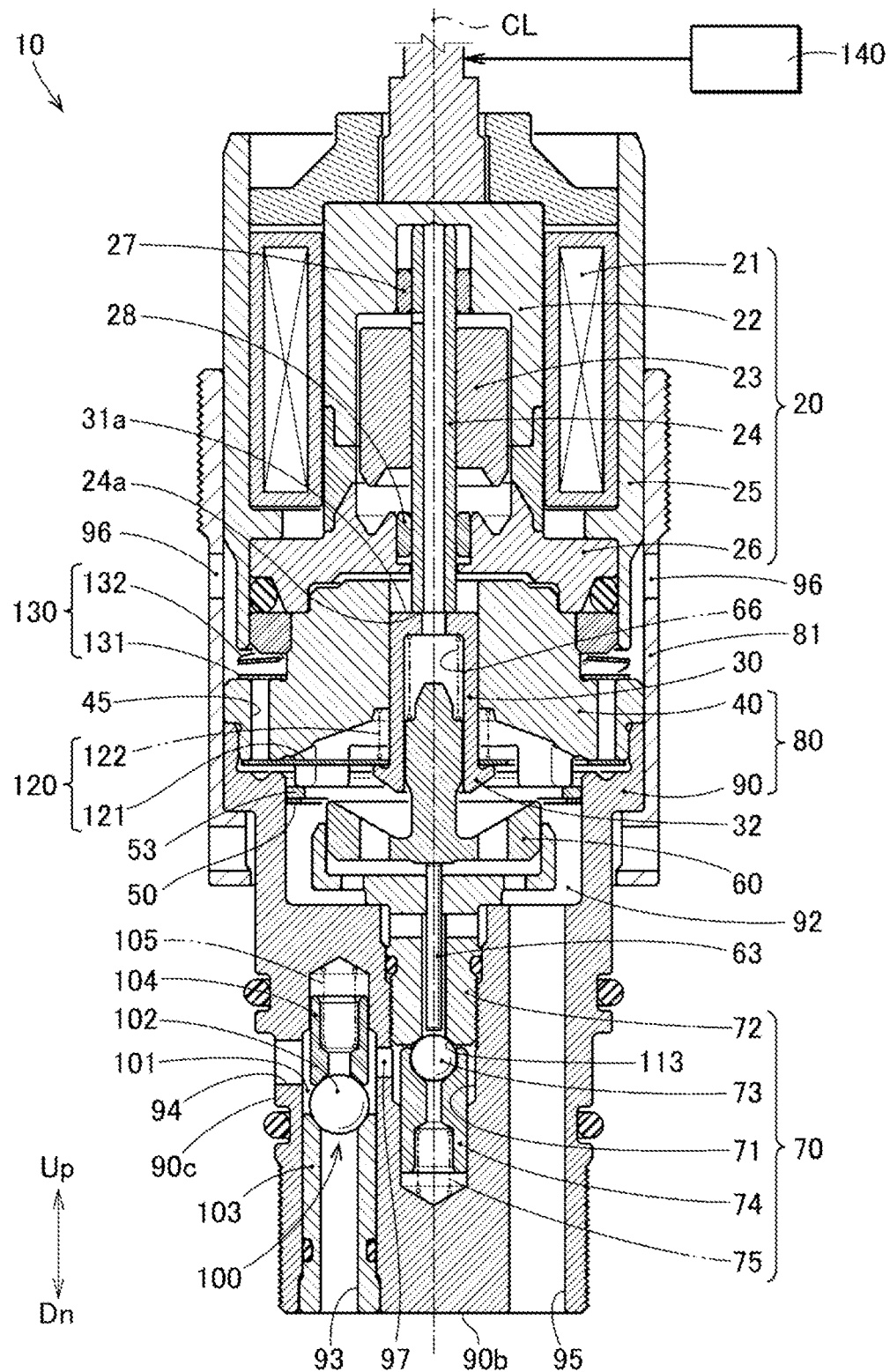
FIG. 1 is a cross-sectional view illustrating a valve device according to Embodiment 1.

Embodiments of the present invention will be described below with reference to the accompanying drawings. The forms illustrated in the accompanying drawings are examples of the present invention, and the present invention is not limited to the forms. The left and right in the description refer to the left and right based on an occupant in a vehicle, respectively. The front and rear in the description refer to the front and rear based on the traveling direction of the vehicle, respectively. In addition, Up and Dn in the drawings indicate upward and downward, respectively.

Embodiment 1

A valve device 10 of Embodiment 1 will be described with reference to FIGS. 1 to 8.

As illustrated in FIG. 1, the valve device 10 is a device that has a coaxial direct acting valve. The valve device 10 includes, an operating portion 20 that includes an operating rod 24 capable of switching the amount of forward and backward movement in a center line CL direction, a first push member 30 that can advance by the same amount and in the same direction as the operating rod 24, and a support member 40 that supports the first push member 30. The valve device 10 further includes, a plate-shaped member 50 against which the tip (lower end) of the first push member 30 is capable of abutting, a second push member 60 that can advance in the same direction as the first push member 30, a first valve 70 that can be opened and closed by the second push member 60, a housing main body 90 that accommodates the first valve 70 and so on, and a second valve 120 that can be opened and closed by moving the operating rod 24 forward and backward. Each of the first valve 70 and the second valve 120 of the valve device 10 can be opened and closed by changing the amount of forward and backward movement of the operating rod 24 in the center line CL direction.

The operating portion 20 includes the operating rod 24 capable of moving forward and backward in the center line CL direction and is preferably configured by an electromagnetic solenoid. The electromagnetic solenoid 20 (operating portion 20) is configured by a push-type solenoid that moves a plunger 23 forward by excitation of an excitation coil 21.

The electromagnetic solenoid 20 is a so-called proportional solenoid in which the amount of current supplied to the excitation coil 21 is proportional to the advance distance (forward and backward movement amount) of the plunger 23. The advance distance is the amount of forward and backward movement from the most retracted first position that is illustrated in FIG. 1. Since the electromagnetic solenoid 20 has a proportional solenoid configuration, the degree of opening of the first valve 70 and the degree of opening of the second valve 120 can be adjusted in accordance with the advance distance of the plunger 23.

The electromagnetic solenoid 20 includes the excitation coil 21, a core 22 provided inside the excitation coil 21, the plunger 23 guided to be capable of moving forward and backward in the core 22, and the operating rod 24 connected to the plunger 23 and having a rod shape (including a pipe shape). The excitation coil 21 drives the operating rod 24 to move forward and backward.

The excitation coil 21, the core 22, the plunger 23, and the operating rod 24 of the electromagnetic solenoid 20 are stored in a solenoid housing 25. The solenoid housing 25 has one open end that is blocked by a lid 26. The operating rod 24 is supported by a bush 27 (bearing 27) in the core 22 and by a bush 28 (bearing 28) in the lid 26. A tip portion 24a of the operating rod 24 in the advance direction (arrow Ag direction illustrated in FIG. 5) penetrates the lid 26.

As illustrated in, for example, FIGS. 1 and 2A to 2C, the electromagnetic solenoid 20 is capable of changing the amount of forward and backward movement of the operating rod 24 in the center line CL direction by changing the amount of forward and backward movement of the plunger 23 by excitation of the excitation coil 21.

Figure 2A:
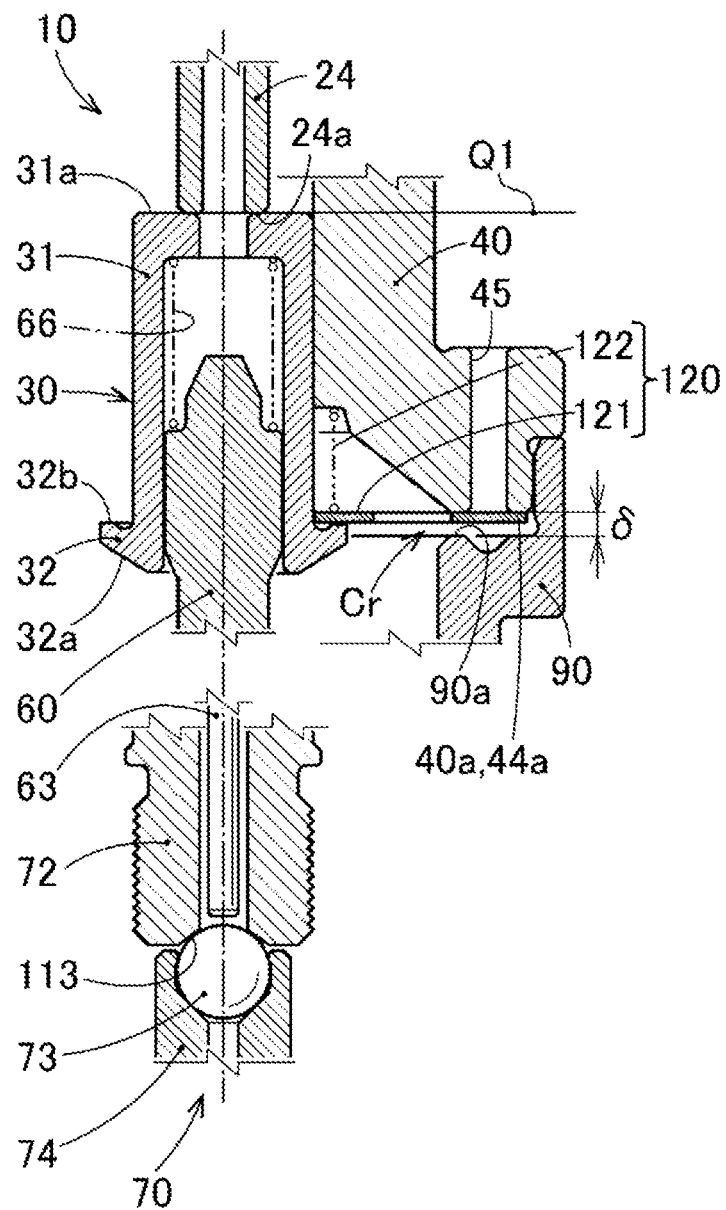
FIG. 2A is a diagram illustrating a first state.
Figure 2C:
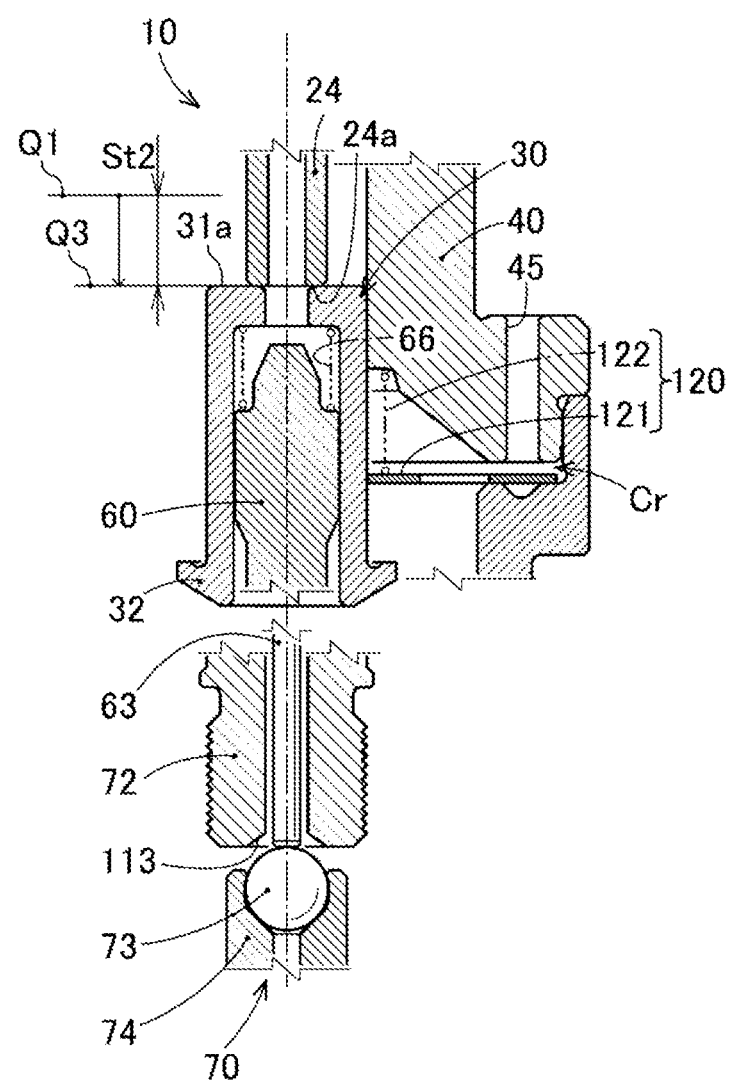
FIG. 2C is a diagram illustrating a third state.

FIGS. 2A to 2C are diagrams schematically illustrating a part of the valve device 10. FIG. 2A is a diagram illustrating a first state where the tip portion 24a of the operating rod 24 is at a first position Q1, at which the tip portion 24a is most retracted. FIG. 2B is a diagram illustrating a second state where the tip portion 24a advances from the first position Q1 by a first forward and backward movement amount St1. FIG. 2C is a diagram illustrating a third state where the tip portion 24a advances from the first position Q1 by a second forward and backward movement amount St2. The valve device 10 switches from the first state to the second state by moving the operating rod 24 forward by the first forward and backward movement amount St1 along the center line CL and switches from the first state to the third state by moving the operating rod 24 forward by the second forward and backward movement amount St2 along the center line CL. In addition, the valve device 10 switches from the third state to the second state by retracting the operating rod 24 along the center line CL so as to change the amount of forward movement of the operating rod 24 from the second forward and backward movement amount St2 to the first forward and backward movement amount St1 and switches from the second state to the first state by retracting the operating rod 24 so as to change the amount of forward movement from the first forward and backward movement amount St1 to zero.

The case of the third state illustrated in FIG. 2C will be described. In the case of the third state, the tip portion 24a of the operating rod 24 moves forward to a third position Q3, which is a position advanced by the second forward and backward movement amount St2 from the first position Q1. In the case of the third state, the first valve 70 and the second valve 120 can be opened.

In the case of the second state illustrated in FIG. 2B, the tip portion 24a of the operating rod 24 moves forward to a second position Q2, which is a position advanced by the first forward and backward movement amount St1 from the first position Q1. The first forward and backward movement amount St1 is smaller than the second forward and backward movement amount St2 illustrated in FIG. 2C (St1<St2). In the case of the second state, only the second valve 120 can be opened.

As illustrated in FIG. 1, the first push member 30, the plate-shaped member 50, the second push member 60, and the first valve 70 are positioned on the center line CL of the operating rod 24. The members are positioned in the order of the first push member 30, the plate-shaped member 50, the second push member 60, and the first valve 70 in the direction from the electromagnetic solenoid 20 toward the first valve 70.

Figure 3:
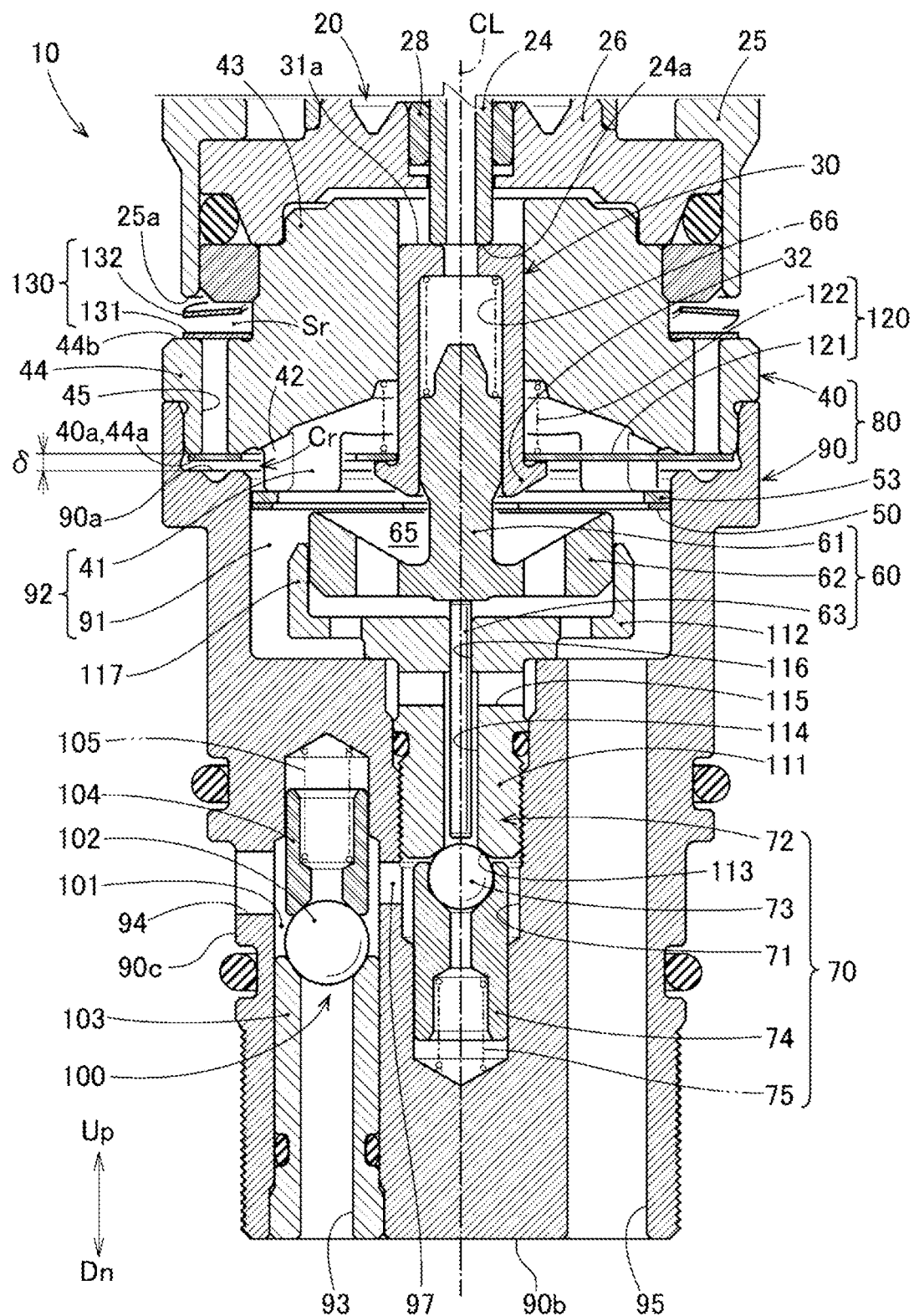
FIG. 3 is an enlarged view illustrating a part of the valve device according to Embodiment 1.
Figure 4:
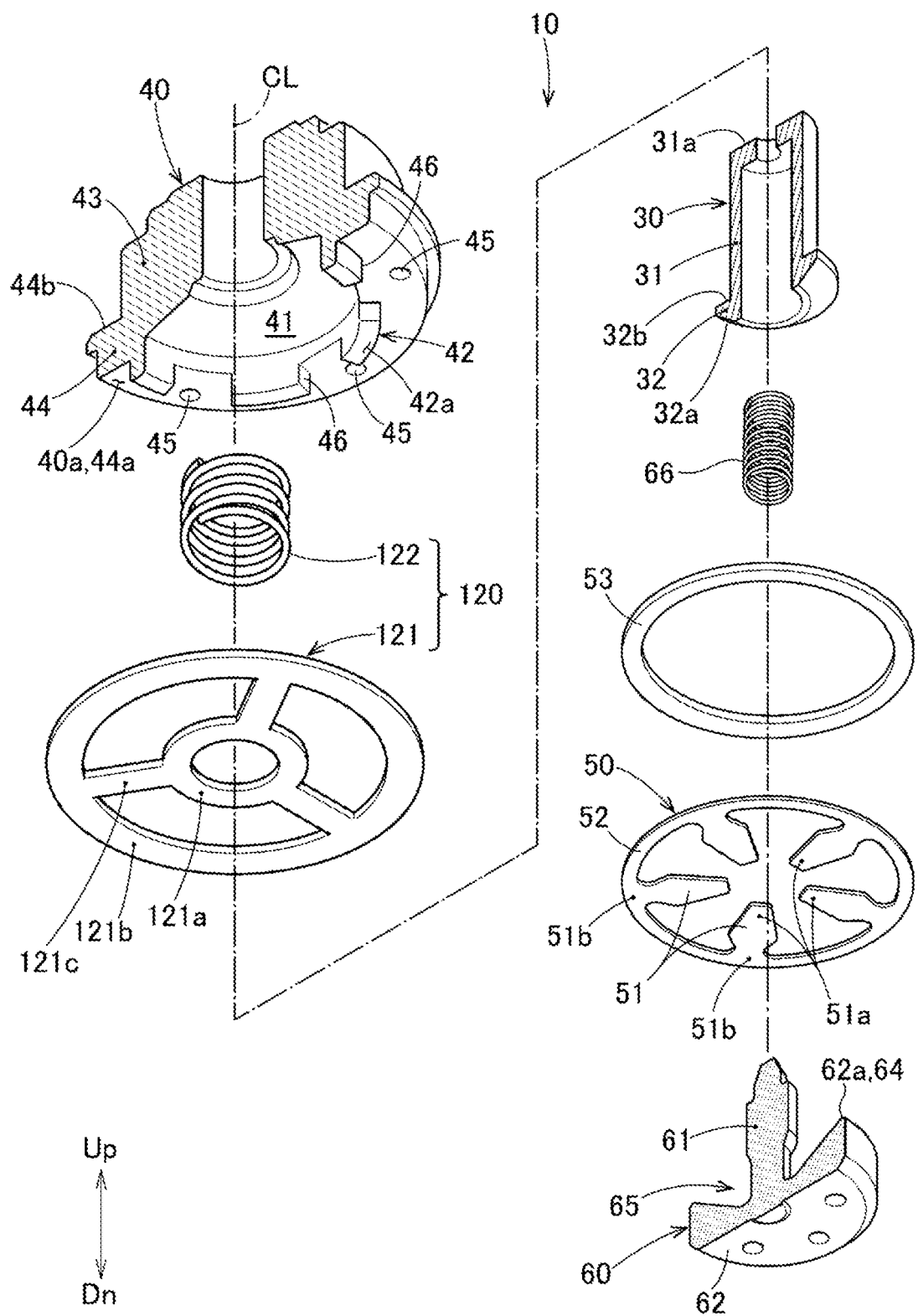
FIG. 4 is an exploded view of a part of the valve device according to Embodiment 1.

As illustrated in FIGS. 1, 3, and 4, the first push member 30 is a bottomed tubular member that is capable of advancing in the same direction as the operating rod 24 by being pushed by the advancing operating rod 24. The first push member 30 includes a bottomed tubular main body 31 and a circular flange-shaped push portion 32, which is integrally configured at the tip (open end) of the main body 31 and is a portion extending in a direction intersecting the forward and backward movement direction of the operating rod 24. The diameter of the push portion 32 is larger than the diameter of the main body 31.

As illustrated in FIGS. 1 and 3, a rear end surface 31a of the first push member 30 is in contact with the tip surface 24a such that the rear end surface 31a can be pushed by the tip surface 24a of the operating rod 24. The main body 31 of the first push member 30 is supported by the guide board 40 so as to be capable of moving forward and backward in the axial direction of the first push member 30 (center line CL direction).

A tip surface 32a (see FIG. 4) of the push portion 32 is a tapered male tapered surface. The tip surface 32a is not limited to the male tapered surface and may be, for example, a convex or concave curved surface. It is preferable that the tip surface 32a is a male tapered surface or a curved surface as described above. The reason will be described later.

As illustrated in FIG. 4, an extending surface 32b (surface 32b on the side opposite to the tip surface 32a), which is the back surface of the push portion 32, is a surface extending in a direction intersecting the center line CL direction, which is the direction of forward and backward movement operation of the operating rod 24. The extending surface 32b is a surface that intersects the direction of forward and backward movement operation of the first push member 30 and faces the operating rod 24 side.

As illustrated in FIGS. 1 and 3, the support member 40 faces the end surface of the lid 26 (surface on the side opposite to the electromagnetic solenoid 20) and is attached to the solenoid housing 25. The support member 40 includes a cylindrical base portion 43 extending in the center line CL direction and a flange 44 integrally provided on the outer peripheral surface of one end of the base portion 43 (end on the side opposite to the electromagnetic solenoid 20) and extending in a direction intersecting the center line CL. The outer diameter of the flange 44 is larger than the outer diameter of the base portion 43. The support member 40 has an end surface configured by a flange surface 44a, which is the end surface of the flange 44 that faces the housing main body 90. Hereinafter, the flange surface 44a may be referred to as "end surface 40a of the support member 40".

As illustrated in FIGS. 3 and 4, the end surface 40a of the support member 40 (surface 40a on the side opposite to the electromagnetic solenoid 20) is provided with a recessed portion 41 recessed from the end surface 40a and a support portion 42 bulging from the end surface 40a. The recessed portion 41 is provided in the base portion 43.

The recessed portion 41 is a truncated cone-shaped recess, and the center line CL is the center line of the recessed portion 41. The diameter and the depth of the recessed portion 41 are set to sizes that do not interfere with the forward and backward motion of the push portion 32.

The support portion 42 is a circular ring-shaped part surrounding the open edge of the recessed portion 41 and extends to the side opposite to the electromagnetic solenoid 20. An end surface 42a (tip surface 42a) of the support portion 42 is a surface inclined with respect to the center line CL of the operating rod 24. The circular ring-shaped support portion 42 has a plurality of communication passages 46 communicating from the recessed portion 41 to the outside of the diameter of the support portion 42.

Further, the support member 40 has a plurality of communication holes 45 penetrating the flange 44 along the center line CL of the operating rod 24. The communication holes 45 are on the side that is farther away from the center line CL than the circular ring-shaped support portion 42. The communication holes 45 function as communication passages allowing a storage chamber 92 in a housing 80, which will be described later, and the outside of the housing 80 to communicate with each other. Hereinafter, the communication hole 45 may be referred to as "communication passage 45".

The second push member 60 will be outlined. As for the second push member 60, a shaft 61 is disposed closer to the electromagnetic solenoid 20 side than the plate-shaped member 50 and an actuated portion 62 and a push rod 63 are disposed closer to the first valve 70 side than the plate-shaped member 50.

Figure 5:
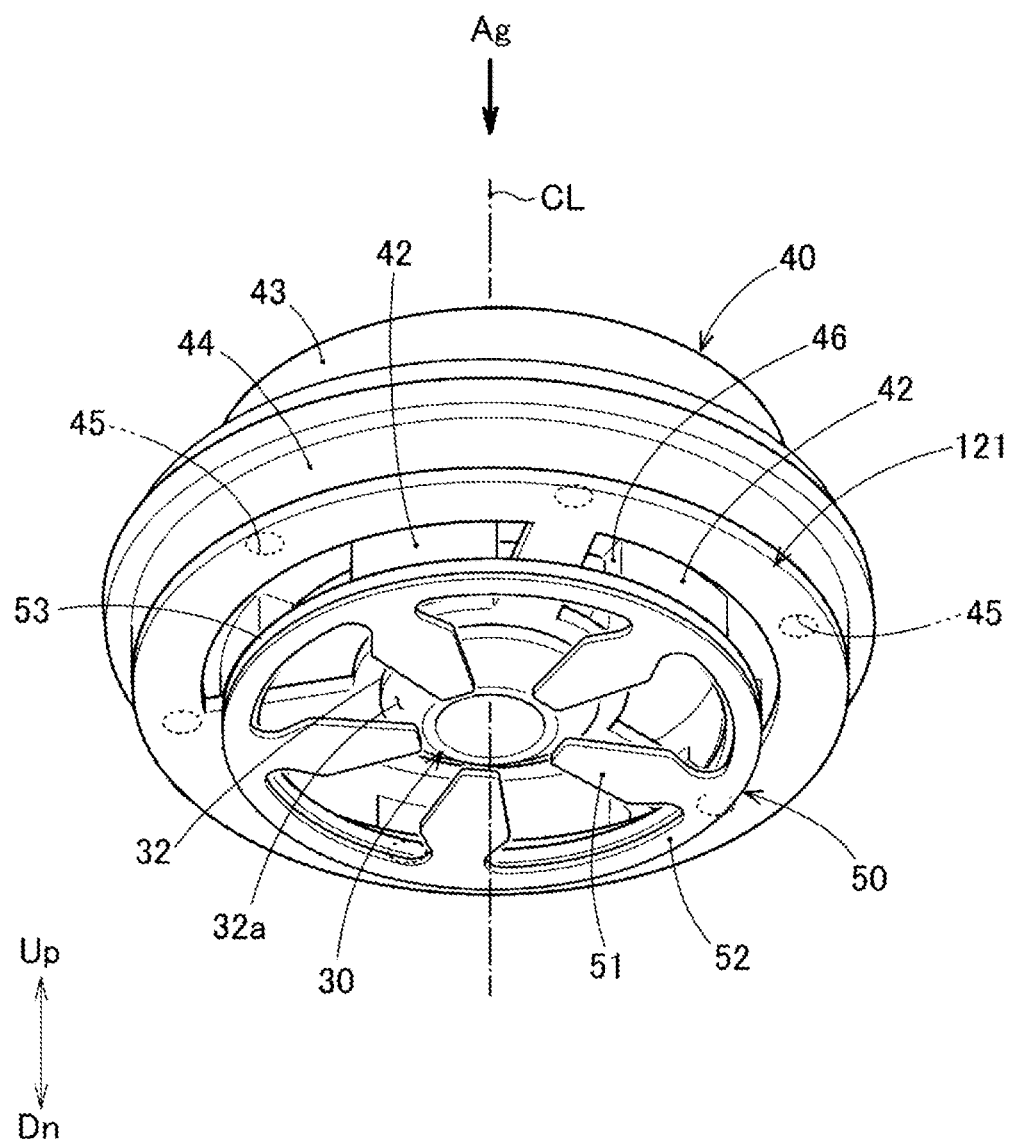
FIG. 5 is a perspective view illustrating a structure of a first push member and surroundings thereof.

As illustrated in FIGS. 4 and 5, the plate-shaped member 50 is configured in a flat plate shape by a plate-shaped elastic member. The plate-shaped member 50 has a plate surface facing the tip surface 32a of the push portion 32 and the end surface 42a of the support portion 42. The plate-shaped member 50 includes one or more (more preferably, a plurality of) arm portions 51 and an annular frame portion 52 connecting the arm portions 51. FIG. 4 illustrates the plate-shaped member 50 that includes the plurality of arm portions 51.

The plurality of arm portions 51 extend in a direction intersecting the axial direction of the first push member 30, that is, a direction intersecting the center line CL of the operating rod 24. The plurality of arm portions 51 are disposed at equal pitches at intervals in the circumferential direction and are integrally connected by the frame portion 52.

Figure 6:
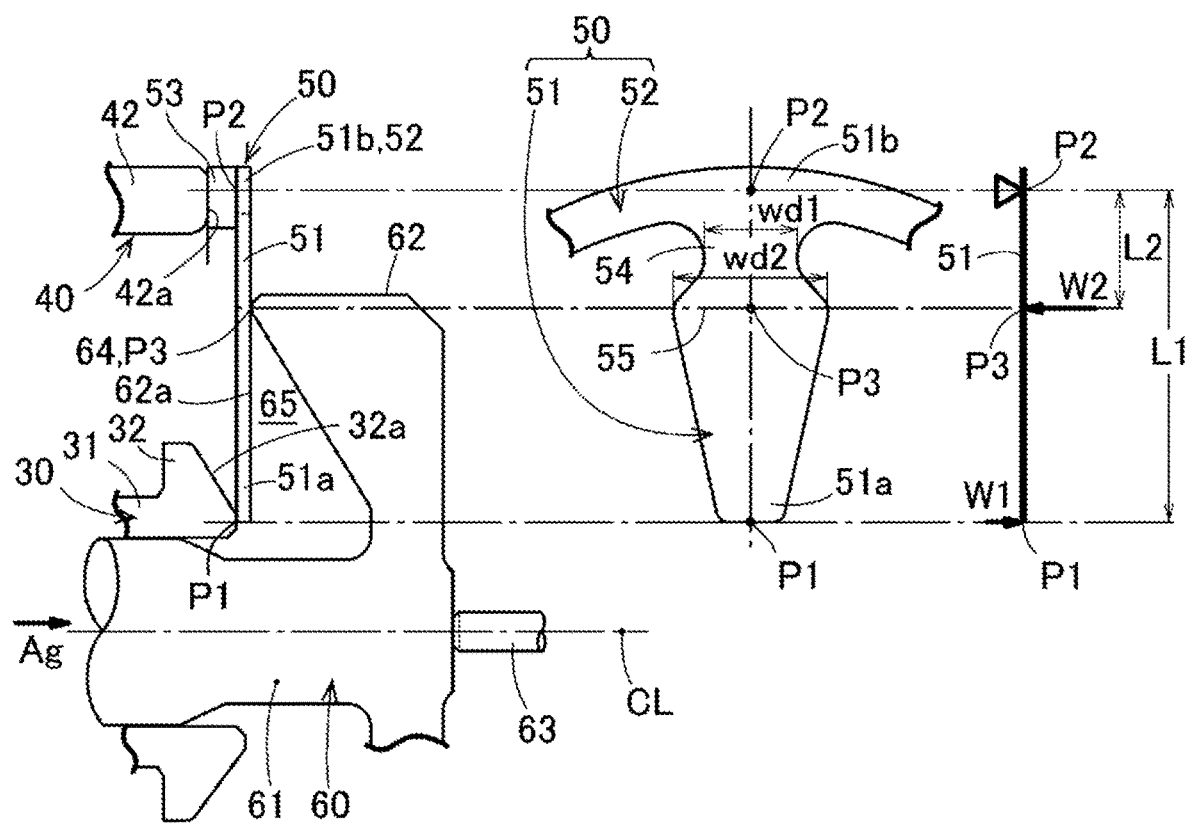
FIG. 6 is a diagram illustrating the structure of the first push member and surroundings thereof.

Each arm portion 51 uses the principle of "lever". As illustrated in FIG. 6, each arm portion 51 has a force point P1 in a first end portion 51a as an end portion on the center line CL side (hereinafter, referred to as "one end portion 51a" in some cases) and has a fulcrum P2 in a second end portion 51b as an end portion on the side away from the center line CL (hereinafter, referred to as "the other end portion 51b" in some cases). Further, each arm portion 51 has an action point P3 between the force point P1 and the fulcrum P2 (between the force point P1 and the fulcrum P2 and on the back surface side of the force point P1 and the fulcrum P2). In this manner, a mechanical boosting mechanism using the principle of "lever" is configured by each arm portion 51.

The one end portion 51a of the arm portion 51 faces the tip surface 32a such that the one end portion 51a of the arm portion 51 can be pushed by the male tapered tip surface 32a of the push portion 32. The point in the one end portion 51a of the arm portion 51 that is pushed by the tip surface 32a of the push portion 32 of the first push member 30 is the force point P1. Each arm portion 51 has one force point P1.

The other end portion 51b of the arm portion 51 is supported via a flat washer 53 or directly by the end surface 42a of the support portion 42. The point in the other end portion 51b of the arm portion 51 that is supported by the end surface 42a of the support portion 42 is the fulcrum P2.

The frame portion 52 interconnects the parts where the fulcrum P2 is disposed, which are provided in each of the plurality of arm portions 51.

The action point P3 is a point where the force received at the force point P1 is increased and applied to the second push member 60 (the second push member 60 is pushed).

The distance from the fulcrum P2 to the force point P1 (first distance) is L1. The distance from the fulcrum P2 to the action point P3 (second distance) is L2, which is shorter than the first distance L1 (L2<L1). Here, W1 (input) is the force that acts on the force point P1 and W2 (acting force) is the force that acts on the action point P3. Equation "L1× W1=L2×W2" is established by the principle of "lever". W2 is equal to W1×(L1/L2), (L1/L2) exceeds 1, and thus the acting force W2 can be increased with respect to the input W1. In other words, a large acting force W2 can be obtained by a small operating force W1.

In the plate-shaped member 50, a width Wd1 of a portion 54 where the frame portion 52 and the plurality of arm portions 51 are connected is narrower than a width Wd2 of a portion 55 where the action point P3 is disposed.

At least a part of the second push member 60 is positioned on the side opposite to the first push member 30 with respect to the plate-shaped member 50. The second push member 60 is capable of advancing in the same direction as the first push member 30 by receiving a force from the action point P3 of each arm portion 51.

As illustrated in FIGS. 3, 4, and 6, the second push member 60 includes the shaft 61 supported so as to be capable of moving forward and backward in the first push member 30, the actuated portion 62 integrally provided at the tip of the shaft 61, and the push rod 63 extending from the actuated portion 62 to the side opposite to the first push member 30. The shaft 61, the actuated portion 62, and the push rod 63 are positioned on the center line CL of the operating rod 24 and are integrally formed or configured by combining individual members. In Embodiment 1, the push rod 63 is configured by a separate member with respect to the actuated portion 62.

A facing surface 62a of the actuated portion 62, which faces the plurality of arm portions 51, is provided with an actuated surface 64 and a recessed portion 65 as a recess for interference prevention.

The actuated surface 64 is a circular annular surface that receives a force from each of the action points P3 of the plurality of arm portions 51. It is preferable that the annular actuated surface 64 is a surface intersecting the axial direction of the first push member 30 (surface inclined with respect to the center line CL of the operating rod 24), that is, a surface parallel to the plurality of moment arms 51 in order to uniformly hit each action point P3. Further, it is preferable that the annular actuated surface 64 has a tapered shape with a cross section tapered toward the action point P3 so that the position of contact with each action point P3 is accurate.

The recessed portion 65 is recessed from the facing surface 62a. With a force received at the force point P1, each arm portion 51 is elastically deformed toward the facing surface 62a of the second push member 60. Since the recessed portion 65 is provided in the facing surface 62a, the facing surface 62a does not interfere with each elastically deformed arm portion 51. By having the recessed portion 65, each arm portion 51 can be elastically deformed with ease regardless of each arm portion 51 and the facing surface 62a being in proximity to each other.

Here, the reason why it is preferable that the tip surface 32a of the push portion 32 of the first push member 30 illustrated in FIG. 6 is a male tapered surface or a curved surface will be described.

Assumed first is a case where the tip surface 32a is a flat surface parallel to the arm portion 51. In this case, the tip surface 32a that advances in the advance direction of the operating rod 24 (above Ag direction) comes into surface contact with the surface of the arm portion 51. In this case, the position of the force point P1 changes to the radial outside of the tip surface 32a (side away from the center line CL) as the arm portion 51 pushed by the tip surface 32a bends. The force that acts on the action point P3 tends to decrease to that extent. In other words, in such a form, it is difficult to sufficiently exhibit the effect of the boosting mechanism.

On the other hand, in Embodiment 1, the tip surface 32a of the push portion 32 is a male tapered surface or a curved surface. Accordingly, a change in the position of the force point P1 can be prevented even if the arm portion 51 pushed by the tip surface 32a bends. As a result, the large force that acts on the action point P3 can be maintained as it is. In other words, the effect of the boosting mechanism can be exhibited even more sufficiently by the tip surface 32a being a male tapered surface or a curved surface. This is the reason why a male tapered surface or a curved surface is used as the tip surface 32a.

In Embodiment 1, a male tapered surface or a curved surface is used as the tip surface 32a of the push portion 32 from the viewpoint of, for example, designing the first push member 30 with ease. Alternatively, the side of the second push member 60 facing the tip surface 32a of the push portion 32 may be a male tapered surface or a curved surface.

As illustrated in FIG. 3, forces in directions away from each other in the axial direction are applied to the first push member 30 and the second push member 60 by a first application member 66. The first application member 66 applies a force directed toward the operating rod 24 to the first push member 30. The first application member 66 is configured by, for example, a compression coil spring interposed between the bottom of the main body 31 of the first push member 30 and the tip portion of the second push member 60.

As illustrated in FIG. 3, the push rod 63 opens and closes the first valve 70. Accordingly, the first valve 70 can be opened and closed in accordance with the amount of displacement (amount of forward and backward movement) of the operating rod 24 and the first push member 30 from the first position Q1.

As illustrated in FIG. 1, the first valve 70 is stored in the housing 80 (valve housing 80). The housing 80 is configured by the support member 40 and the housing main body 90. The support member 40 and the housing main body 90 are fitted in a cylindrical housing connecting member 81 in a state of being in axial contact with each other. In order to incorporate the valve device 10 into another device, the housing connecting member 81 is screwed into the other device. The housing connecting member 81 has a communication hole 96 penetrating the housing connecting member 81 in a direction intersecting the center line CL. Hereinafter, the communication hole 96 may be referred to as "second communication hole 96".

As illustrated in FIG. 3, a first end surface 90a of the housing main body 90 faces the end surface 40a of the support member 40 (flange surface 44a of the flange 44) with a gap Cr. A size δ of the gap Cr (width δ in the center line CL direction) is preset so as to define the opening and closing operation of the second valve 120 and corresponds to the first forward and backward movement amount St1 illustrated in FIG. 2B.

The housing main body 90 is attached via the support member 40 or directly to the solenoid housing 25 and has a recessed portion 91. In other words, the housing main body 90 has a recessed portion 91 storing the plate-shaped member 50 and the second push member 60. The recessed portion 91 is a columnar recess, and the center line of the recessed portion 91 is the center line CL of the operating rod 24. The recessed portion 91 is connected to the recessed portion 41 of the support member 40. The storage chamber 92 (inner portion 92) of the housing 80 is configured by the recessed portion 41 of the support member 40 and the recessed portion 91 of the housing main body 90. The first push member 30, the plate-shaped member 50, and the second push member 60 are stored in the storage chamber 92.

The housing main body 90 has two ports 93 and 94 through which a fluid is capable of passing and one first communication hole 95. The first port 93 is a fluid inlet and is open to a second end surface 90b of the housing main body 90 (end surface 90b on the side opposite to the recessed portion 91). The second port 94 is a fluid inlet and outlet and is open to a side surface 90c of the housing main body 90. The first communication hole 95 is open to the second end surface 90b of the housing main body 90 and communicates with the storage chamber 92.

A valve 100 (one-way valve 100), which is a ball check valve, is interposed between the first port 93 and the second port 94. The valve 100 is stored in the housing main body 90. The valve 100 includes a valve chamber 101 provided between the first port 93 and the second port 94, a ball-shaped valve body 102 stored in the valve chamber 101, a valve seat 103 facing the valve chamber 101 and provided at the first port 93, and an application member 105 applying a force in the direction of pressing against the valve seat 103 to the valve body 102 via a pressing member 104. The application member 105 is configured by, for example, a compression coil spring. Hereinafter, the valve 100 may be appropriately referred to as "first check valve 100".

The second port 94 and the valve chamber 101 communicate with a valve chamber 71 of the first valve 70 via a third communication hole 97.

The valve 100 allows the first port 93 and the valve chamber 101 to communicate with each other in a case where the pressure of the first port 93 exceeds a preset reference pressure. As a result, the first port 93, the second port 94, the valve chamber 101, and the valve chamber 71 of the first valve 70 communicate with each other.

The first valve 70 is stored in the housing main body 90 of the housing 80. The first valve 70 includes a valve body 73, the valve chamber 71 accommodating the valve body 73, a pressing member 74 supporting the valve body 73, a valve seat 72 capable of coming into contact with the valve body 73, and an application member 75 applying a force in the direction of bringing the pressing member 74 closer to the valve seat 72 to the pressing member 74. The application member 75 is configured by, for example, a compression coil spring.

The valve seat 72, the valve body 73, the pressing member 74, and the application member 75 are arranged in this order in the advance direction of the second push member 60 such that the center line thereof is the center line CL.

The valve seat 72 includes a columnar base portion 111 attached by being screwed into the housing main body 90, an annular portion 112 having a bottomed annular shape and integrally provided at one end of the base portion 111 (end of the second push member 60 on the actuated portion 62 side), and a seat surface 113 formed in the end portion of the base portion 111 on the side opposite to the side where the annular portion 112 is provided. The seat surface 113 is a female tapered surface.

Further, the valve seat 72 has a first flow path 114 communicating along the center line CL from the seat surface 113 to the one end of the base portion 111 and a second flow path 115 penetrating the valve seat 72 from the first flow path 114 to the outer peripheral surface of the valve seat 72. The annular portion 112 includes a guide hole 116 communicating to the first flow path 114 along the center line CL and slidably guiding the push rod 63 and an annular guide ring 117 slidably guiding the outer peripheral surface of the actuated portion 62 of the second push member 60. The push rod 63 is capable of moving forward and backward through the first flow path 114 and the valve seat 72.

The valve body 73 is a member stored in the valve chamber 71 and opens and closes the valve seat 72. The valve body 73 is preferably spherical. The tip of the push rod 63 is capable of extruding the valve body 73 with respect to the seat surface 113. The pressing member 74 presses the valve body 73 against the seat surface 113 by the force of the application member 75, which is configured by a compression coil spring or the like.

As illustrated in FIGS. 3 and 4, the second valve 120 has a valve body 121 and a second application member 122.

The valve body 121 is a flat plate-shaped member and is disposed in the gap Cr between the end surface 40a of the support member 40 and the first end surface 90a of the housing main body 90. The valve body 121 is a member in which an annular first plate body 121a having a small diameter, an annular second plate body 121b larger in diameter than the first plate body 121a and disposed so as to surround the first plate body 121a, and a plurality of arm portions 121c connecting the first plate body 121a and the second plate body 121b are integrally configured. The annular first plate body 121a is slidably fitted to the outer peripheral surface of the push portion 32 and abuts against the extending surface 32b, which is the back surface of the push portion 32.

The second plate body 121b is capable of opening and closing the plurality of communication passages 45 penetrating the flange 44 of the support member 40. As illustrated in FIG. 3, a state where the communication passage 45 is closed by the second plate body 121b overlapping the flange surface 44a of the flange 44 is the closed state of the second valve 120. On the other hand, a state where the second plate body 121b is away from the flange surface 44a is the open state of the second valve 120.

The second application member 122 applies a force in the direction away from the flange surface 44a of the support member 40 (direction of opening the second valve 120) to the valve body 121 by being interposed between the bottom surface of the recessed portion 41 of the support member 40 and the first plate body 121a of the valve body 121. The second application member 122 is configured by, for example, a compression coil spring.

In this manner, the valve body 121 of the second valve 120 abuts against the extending surface 32b of the first push member 30 and a force directed toward the extending surface 32b of the first push member 30 is applied by the second application member 122 (second spring 122).

Further, the second application member 122 applies a force in the direction of bringing the extending surface 32b of the push portion 32 of the first push member 30 closer to the plate-shaped member 50 via the valve body 121 of the second valve 120. As a result, the second application member 122 applies a force directed away from the operating rod 24 to the first push member 30.

As described above, the first application member 66 applies a first application force, which is a force directed toward the operating rod 24, to the first push member 30. The first application force is larger than a second application force, which is directed away from the operating rod 24 and is applied to the first push member 30 by the second application member 122. The second valve 120 closes the communication passage 45 in the first state by receiving the force that is the difference between the first application force and the second application force and, as illustrated in FIG. 2B, switches to the second state where the communication passage 45 is opened by the operating rod 24 being displaced, with a force received from the operating portion 20, so as to move forward from the first position Q1 to the second position Q2.

As illustrated in FIG. 3, a gap Sr is provided between one end surface 25a of the solenoid housing 25 and a back surface 44b of the flange 44 (surface 44b on the side opposite to the end surface 40a of the support member 40). A check valve 130 (one-way valve 130) is disposed in the gap Sr. The check valve 130 includes a valve body 131 opening and closing the plurality of communication passages 45 and an application member 132 applying a force in the direction of closing the communication passage 45 to the valve body 131.

The valve body 131 is configured by an annular flat plate loosely fitted to the base portion 43 of the support member 40. The valve body 131 closes the plurality of communication passages 45 by overlapping the back surface 44b of the flange 44. The application member 132 applies a force directed toward the back surface 44b of the flange 44 to the valve body 131 and is configured by, for example, a corrugated spring.

For example, the pressure in the storage chamber 92 (internal pressure) acts on the valve body 131 through the communication passage 46 (see FIG. 4) and the communication passage 45. In a case where the internal pressure does not exceed the pressure outside the storage chamber 92 (pressure outside the valve device 10), the valve body 131 closes the communication passage 45 by the force that is applied from the application member 132. On the other hand, when the pressure in the accommodating chamber 92 exceeds the pressure outside the storage chamber 92, the force in the direction of moving the valve body 131 away from the back surface 44b of the flange 44 exceeds the force in the direction of bringing the valve body 131 closer to the back surface 44b, and thus the valve body 131 is separated from the back surface 44b and the communication passage 45 is opened. As a result, the storage chamber 92 and the outside of the valve device 10 communicate with each other and communication inside and outside the housing 80 is possible.

Hereinafter, the check valve 130 may be appropriately referred to as "second check valve 130".

As illustrated in FIG. 1, the operating portion 20 is controlled by a control unit 140. The control unit 140 controls the operation of the operating portion 20 so as to change the excitation state of the excitation coil 21 in order to switch the operating rod 24 between the first state illustrated in FIG. 2A, the second state illustrated in FIG. 2B, and the third state illustrated in FIG. 2C. For example, the control unit 140 controls the operation of the operating portion 20 so as to excite the excitation coil 21 only for a certain preset time (e.g. minute time of approximately 10 msec) in order to switch the operating rod 24 from the first state to the second state at preset regular intervals.

Next, the operation of the valve device 10 will be described.

As described above, in the electromagnetic solenoid 20 illustrated in FIG. 1, the amount of current supplied to the excitation coil 21 and the amount by which the operating rod 24 advances are proportional to each other. The control unit 140 is capable of changing the amount by which the operating rod 24 advances by supplying a preset current value to the excitation coil 21 by which the operating rod 24 is in the first state. As a result, the operating rod 24 can be switched between, for example, the first state and the second state.

As illustrated in FIG. 1, the plunger 23 and the operating rod 24 are at a retraction position in a state where, for example, the excitation coil 21 of the electromagnetic solenoid 20 is not energized, that is, at a current value I of 0 (not illustrated). As illustrated in FIG. 2A, in this state, the tip portion 24a of the operating rod 24 is at the most retracted first position Q1 and the operating rod 24 is in the first state.

In the second state illustrated in FIG. 2B, a first current amount, which is the amount of current supplied from the control unit 140 to the excitation coil 21, is small. The operating rod 24 moves forward by the small first forward and backward movement amount St1 with respect to the most retracted first position Q1. In other words, the tip portion 24a of the operating rod 24 moves the first push member 30 forward by moving forward from the first position Q1 to the second position Q2. At this time, the push portion 32 supporting the valve body 121 of the second valve 120 also moves forward. As a result, the valve body 121 of the second valve 120 to which a force is applied from the second application member 122 is separated from the flange surface 44a of the support member 40 and opens the communication passage 45. In other words, the second valve 120 is opened. In this state, the amount of forward movement of the first push member 30 is small, and thus the first valve 70 can be maintained in the closed state and the second valve 120 can be opened alone.

Figure 7:
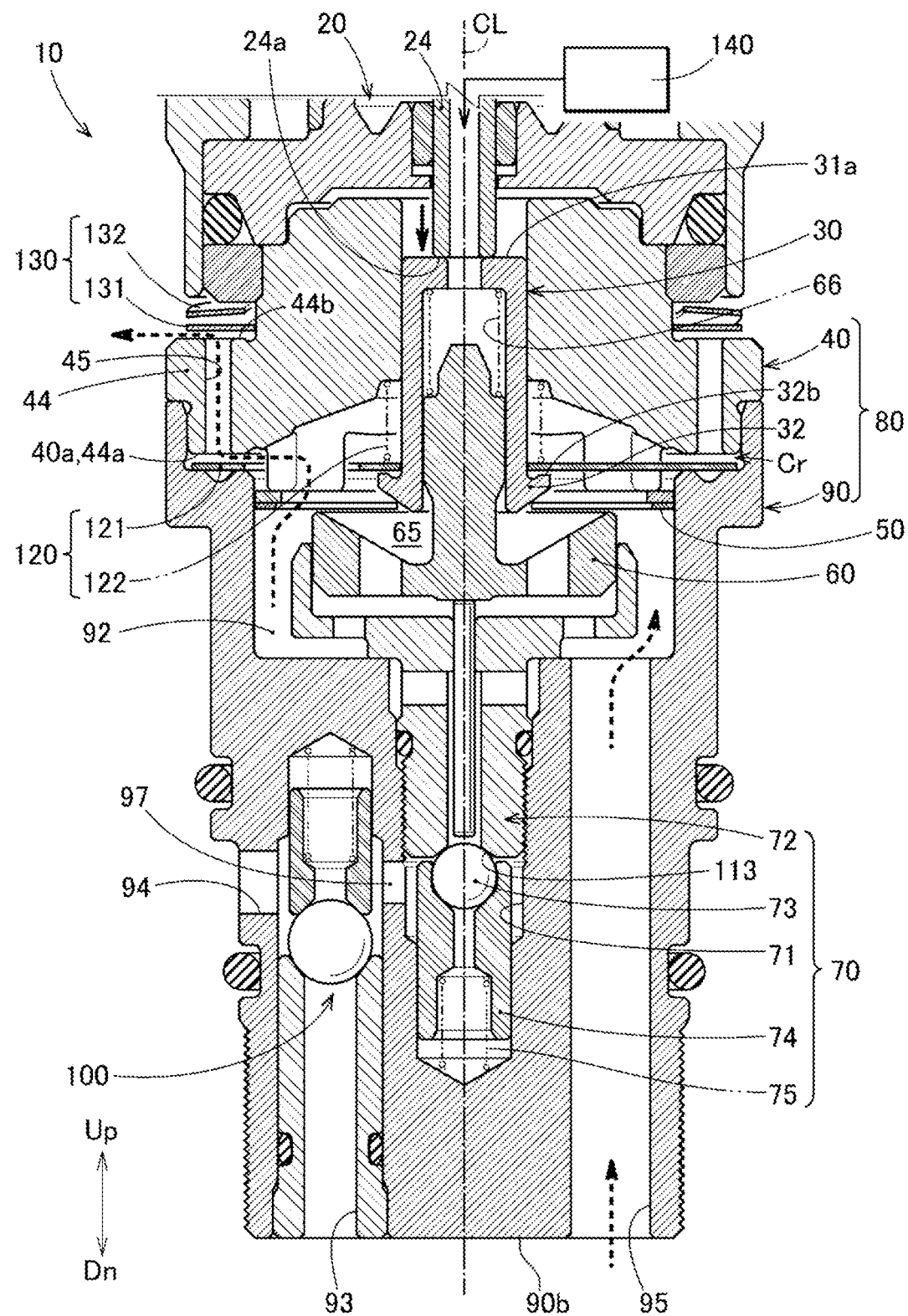
FIG. 7 is a diagram illustrating the valve device according to Embodiment 1.

The second state illustrated in FIG. 2B will be described with reference to FIG. 7. A fluid that enters the storage chamber 92 of the housing 80 from the first communication passage 95 reaches the communication passage 45 from the second valve 120 in the open state. In a case where the internal pressure of the storage chamber 92 exceeds the pressure outside the storage chamber 92, the force in the direction of moving the application member 132 away from the back surface 44b is larger than the force in the direction of bringing the application member 132 closer to the back surface 44b, and thus the valve body 131 is opened. In other words, the check valve 130 is opened to release the pressure in the storage chamber 92 to the outside of the valve device 10. As a result, the air that is accumulated in the housing 80 can be discharged to the outside of the valve device 10, and thus the air accumulation phenomenon can be improved.

On the other hand, in the third state illustrated in FIG. 2C, a second current amount, which is the amount of current supplied from the control unit 140 to the excitation coil 21, is larger than the first current amount as the amount of current supplied in the state illustrated in FIG. 2B. Accordingly, the operating rod 24 moves forward by the second forward and backward movement amount St2, which is larger than the first forward and backward movement amount St1, with respect to the most retracted first position Q1. In other words, the tip portion 24a of the operating rod 24 moves the first push member 30 forward by moving forward from the first position Q1 to the third position Q3. As a result, the first valve 70 and the second valve 120 are opened.

Figure 8:
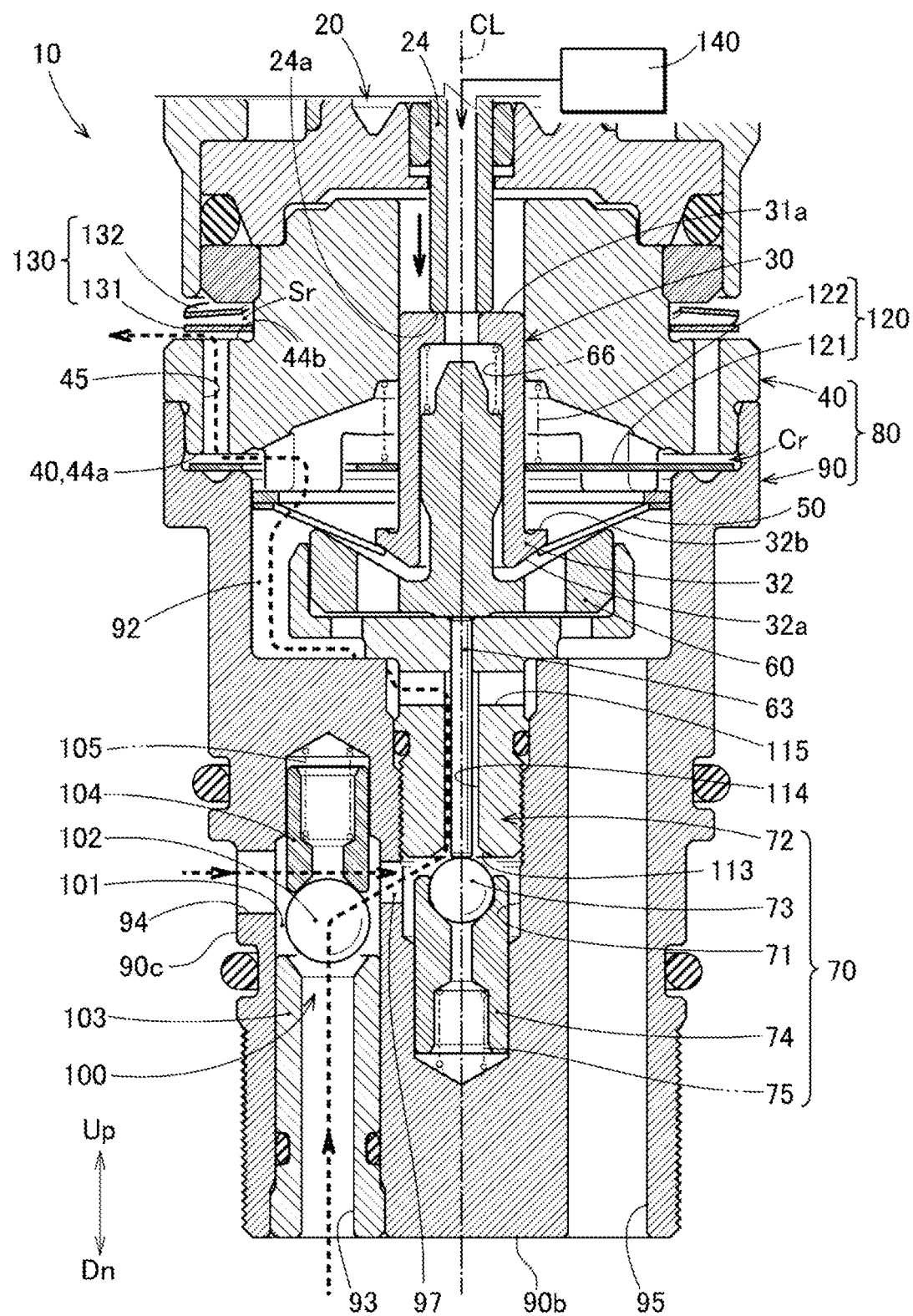
FIG. 8 is a diagram illustrating the valve device according to Embodiment 1.

The third state illustrated in FIG. 2C will be described with reference to FIG. 8. A fluid that enters from the first port 93 and the second port 94 enters the storage chamber 92 through the first check valve 100, the first valve 70 in the open state, the first flow path 114, and the second flow path 115. The fluid that enters the storage chamber 92 reaches the communication hole 45 from the second valve 120 in the open state. In a case where the internal pressure of the storage chamber 92 exceeds the pressure outside the storage chamber 92, the force in the direction of moving the application member 132 away from the back surface 44b is larger than the force in the direction of bringing the application member 132 closer to the back surface 44b, and thus the valve body 131 is opened. In other words, the check valve 130 is opened to release the pressure in the storage chamber 92 to the outside of the valve device 10. As a result, the air that is accumulated in the housing 80 can be discharged to the outside of the valve device 10, and thus the air accumulation phenomenon can be improved.

The above description of Embodiment 1 is summarized as follows.

As illustrated in FIGS. 1 and 2A to 2C, the valve device 10 has the operating portion 20 provided with the operating rod 24 switchable between the first state existing at the most retracted first position Q1 illustrated in FIG. 2A, the second state displaced from the first position Q1 by the preset first forward and backward movement amount St1, and the third state displaced from the first position Q1 by the second forward and backward movement amount St2 larger than the first forward and backward movement amount St1. Here, the direction in which the operating rod 24 moves in switching from the first state to the second state is the same as the direction in which the operating rod 24 moves in switching from the first state or the second state to the third state. The valve device 10 further has the first push member 30 capable of advancing by the same amount of forward and backward movement and in the same direction as the operating rod 24 by being pushed by the operating rod 24, the first valve 70 capable of being opened and closed in accordance with the amount of displacement of the operating rod 24 and the push member 30 from the first position Q1, and the housing 80 storing the first valve 70. In addition to these configurations, the valve device 10 has the second valve 120 capable of opening and closing the communication passage 45 allowing communication inside and outside the housing 80 by switching the operation of the operating rod 24 so as to switch from the first state illustrated in FIG. 2A to the second state illustrated in FIG. 2B.

By opening and closing the second valve 120 with the single operating portion 20 driving the first valve 70, the housing 80 where the first valve 70 is stored can be opened and closed in and out. Accordingly, there is no need to make a separate operating portion for opening and closing the second valve 120. Accordingly, it is possible to provide the valve device 10 capable of eliminating the air accumulation phenomenon in the housing 80. Moreover, the opening and closing operation of the first valve 70 is not affected.

As illustrated in FIG. 1, the valve device 10 further includes the first application member 66 applying a force directed toward the operating rod 24 to the push member 30 and the second application member 122 applying a force directed away from the operating rod 24 to the push member 30. The first application force, which is applied to the push member 30 by the first application member 66, is larger than the second application force, which is applied to the push member 30 by the second application member 122. The second valve 120 blocks the communication passage 45 in the first state by receiving the force that is the difference between the first application force and the second application force and opens the communication passage 45 by switching the operating rod 24 from the first state to the second state or the third state.

The valve device 10 maintains the second valve 120 in the closed state by the force that is the difference between the first application force and the second application force. Accordingly, the operating force of the operating rod 24 opening the second valve 120 in order to improve the air accumulation phenomenon can be a small force simply eliminating the difference between the first application force and the second application force.

As illustrated in FIGS. 1 and 2A to 2C, the operating portion 20 is configured by the electromagnetic solenoid 20 including the excitation coil 21 driving the operating rod 24 to move forward and backward and further includes the control unit 140 controlling the excitation coil 21. When the operating rod 24 is in the first state, the control unit 140 controls the operation of the operating portion 20 so as to change the excitation state of the excitation coil 21 only for a certain preset time such that the operating rod 24 is switched to the second state at preset regular intervals.

The control unit 140 controls the operation of the operating portion 20 so as to change the excitation state of the excitation coil 21 only for a certain time at regular intervals. Accordingly, by intermittently moving the operating rod 24 in the first state to switch to the second state, the second valve 120 can be opened only for a certain time (e.g. minute time) at regular intervals. As a result, it is possible to improve the air accumulation phenomenon while affecting the performance of the valve device 10 as little as possible.

More specifically, the valve device 10 has the electromagnetic solenoid 20. The electromagnetic solenoid 20 includes the operating rod 24 switchable between the first state existing at the most retracted first position Q1, the second state displaced from the first position Q1 by the preset first forward and backward movement amount St1, and the third state displaced from the first position Q1 by the second forward and backward movement amount St2 larger than the first forward and backward movement amount St1 and the excitation coil 21 driving the operating rod 24 to move forward and backward. The valve device 10 has the control unit 140 controlling the operation of the electromagnetic solenoid 20 so as to change the excitation state of the excitation coil 21 only for a certain preset time in order to switch the operating rod 24 from the first state to the second state at preset regular intervals. The valve device 10 further has the first push member 30 capable of advancing by the same amount of forward and backward movement and in the same direction as the operating rod 24 by being pushed by the operating rod 24 and having the extending surface 32b extending in a direction intersecting the direction of forward and backward movement operation and facing the operating rod 24 side. In addition, the valve device 10 has the first valve 70 capable of being opened and closed in accordance with the amount of displacement of the operating rod 24 and the first push member 30 from the first position Q1, the housing 80 storing the first valve 70, and the second valve 120 capable of opening and closing the housing 80 in and out by switching the operation of the operating rod 24 so as to switch between the first state and the second state. The valve device 10 further has the first spring 66 applying a force directed toward the first push member 30 to the operating rod 24 and the second spring 122 applying the second application force smaller than the first application force applied to the operating rod 24 by the first spring 66 in the direction away from the first push member 30 to the operating rod 24. The second valve 120 includes the flat plate-shaped valve body 121 overlapping the extending surface 32b of the first push member 30. A force directed toward the extending surface 32b is applied to the flat plate-shaped valve body 121 by the second spring 122. The second valve 120 blocks the communication passage 45 in the first state by receiving the force that is the difference between the first application force and the second application force and opens the communication passage 45 by switching the operating rod 24 from the first state to the second state or the third state.

Next, a valve device 10A of Embodiment 2 will be described with reference to FIG. 9.

Embodiment 2

Figure 9:
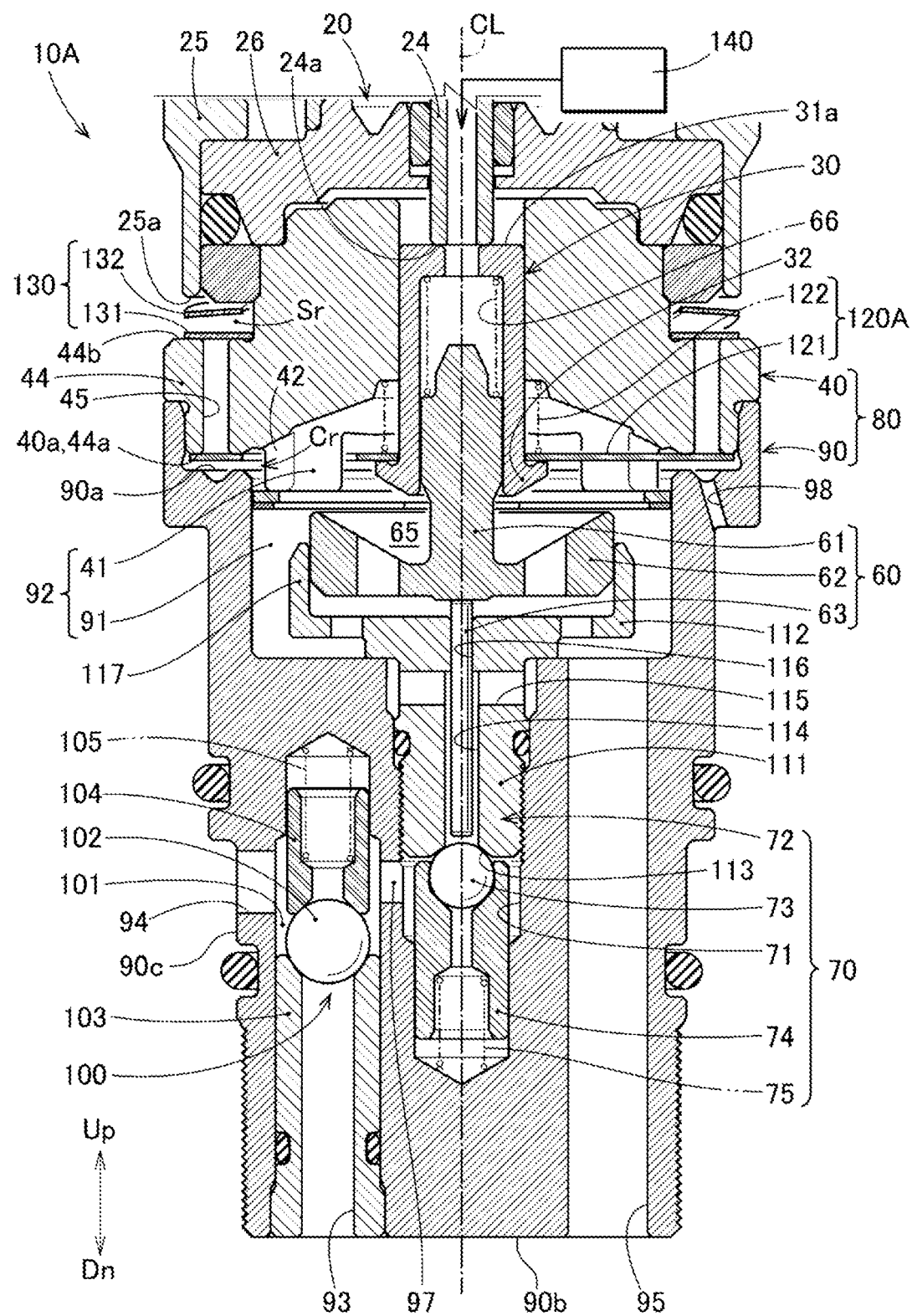
FIG. 9 is an enlarged view illustrating a part of a valve device according to Embodiment 2.

FIG. 9 is an enlarged view illustrating a part of the valve device 10A and corresponds to FIG. 3 illustrating the valve device 10. The valve device 10A illustrated in FIG. 9 is characterized in that the second valve 120 in the valve device 10 illustrated in FIG. 3 is replaced with a second valve 120A. The valve device 10A illustrated in FIG. 9 is identical to the valve device 10 as to the other basic configurations. In the description of the valve device 10A, the same reference numerals are used for the parts common to the valve devices 10 and 10A with redundant detailed description omitted.

The second valve 120A of the valve device 10A is a "closed" configuration by the operating rod 24 at the first position Q1 (see FIG. 2A) receiving a force of forward movement and the force that is the difference between the first application force of the first application member 66 and the second application force of the second application member 122 being canceled out.

In Embodiment 2, a communication hole 98 allowing communication inside and outside the housing 80 is formed in the first end surface 90a of the housing main body 90. The communication hole 98 is positioned on the side opposite to the communication passage 45 with respect to the valve body 121 of the second valve 120A. The second valve 120A of Embodiment 2 opens and closes the communication hole 98. Accordingly, the second valve 120A of Embodiment 2 is opened in the first state and closed in the second state and the third state. The second valve 120 of Embodiment 1 is closed in the first state and opened in the second state and the third state. Accordingly, the second valve 120A is closed when the operating rod 24 is moved in the same manner as when the second valve 120 is opened and the second valve 120A is opened when the operating rod 24 is moved in the same manner as when the second valve 120 is closed.

The control unit 140 of Embodiment 2 supplies a small amount of current to the electromagnetic solenoid 20 so as to close the second valve 120A, that is, in order to move the operating rod 24 forward by applying a force sufficient to cancel out the difference between the first application force of the first application member 66 and the second application force of the second application member 122 to the operating rod 24. As a result, the difference between the first application force and the second application force is canceled out, and thus the communication hole 98 is closed by the valve body 121. The control unit 140 is capable of switching the open and closed states of the second valve 120A by controlling the operation of the electromagnetic solenoid 20 so as to change the excitation state of the excitation coil only for a certain preset time (e.g. minute time of approximately 10 msec) at preset regular intervals.

The other actions and effects of Embodiment 2 are the same as those of Embodiment 1 described above.

Figure 10:
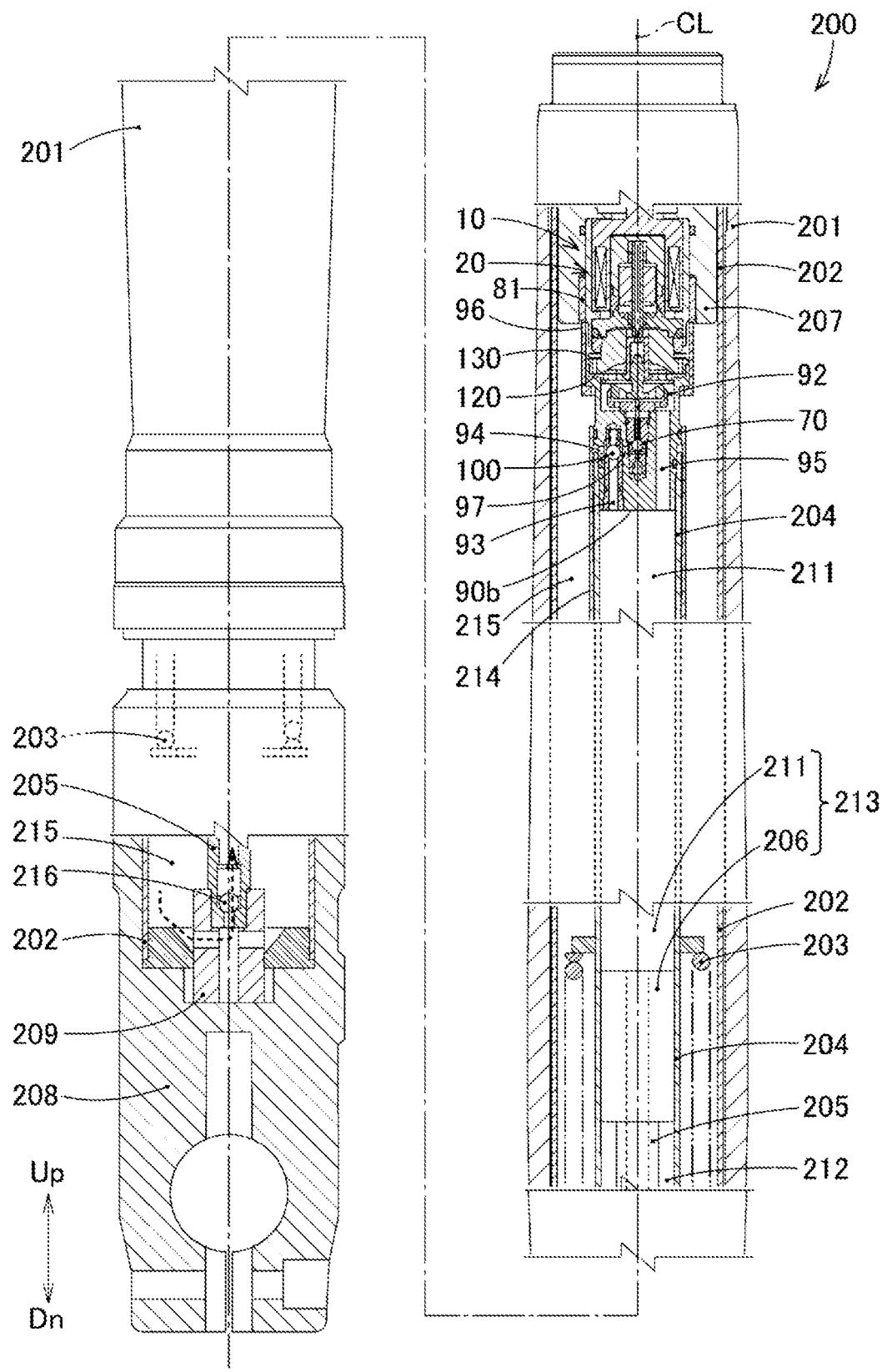
FIG. 10 is a cross-sectional view illustrating a vehicle height adjusting device equipped with the valve device according to Embodiment 1.
Figure 11:
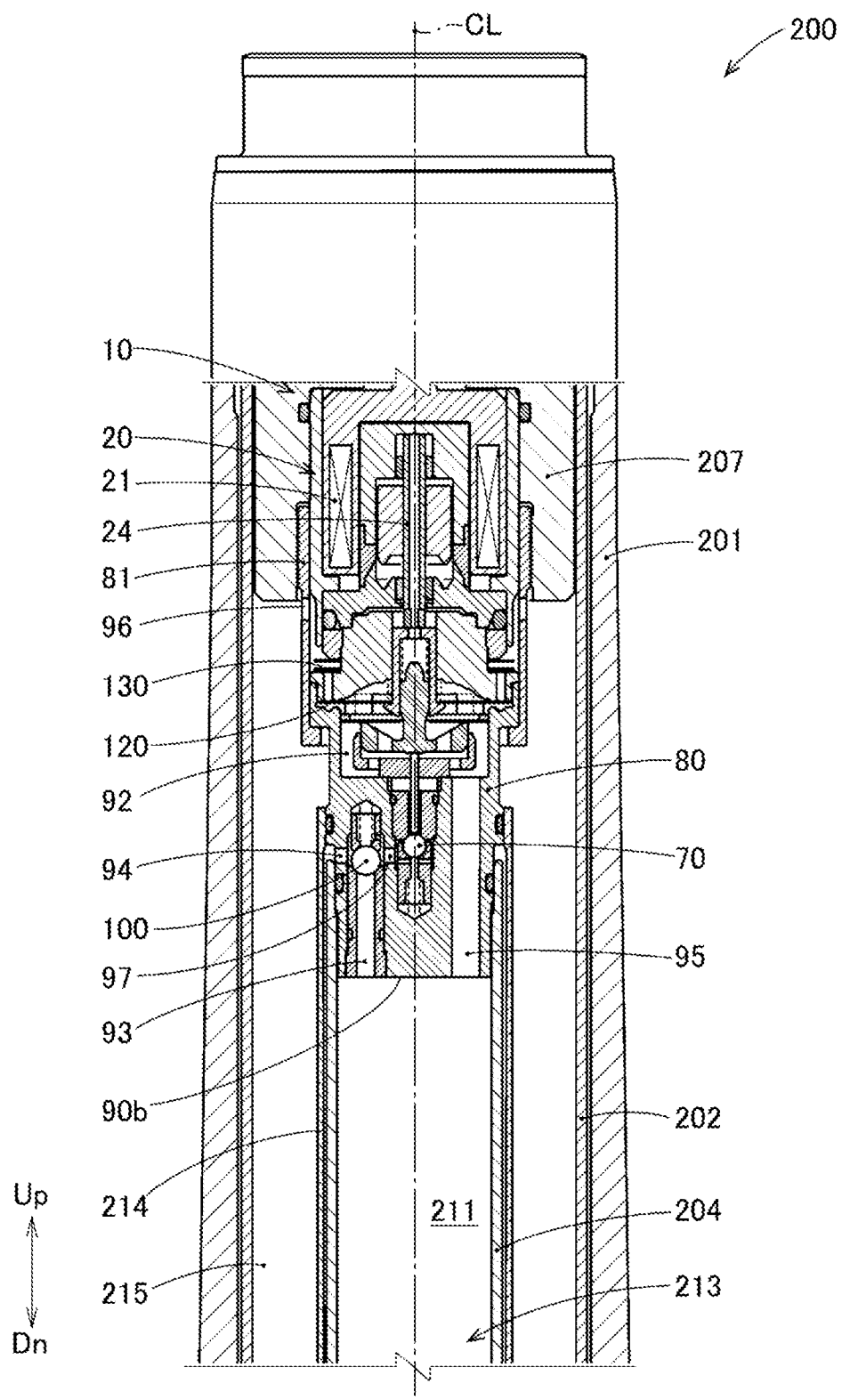
FIG. 11 is an enlarged view illustrating surroundings of the valve device of the vehicle height adjusting device.

Next, Embodiment 3 will be described with reference to FIGS. 10 and 11.

Embodiment 3

Embodiment 3 is characterized in that the valve device 10 according to Embodiment 1 is applied to a vehicle height adjusting device 200. FIG. 10 is a cross-sectional view illustrating the vehicle height adjusting device 200 equipped with the valve device 10 according to Embodiment 1. FIG. 11 is an enlarged view of surroundings of the valve device 10 in the vehicle height adjusting device 200 illustrated in FIG. 10.

The vehicle height adjusting device 200 increases the height of a vehicle while the vehicle travels and decreases the vehicle height for boarding and alighting facilitation while the vehicle is stopped. The vehicle height adjusting device 200 is adopted for a vehicle and so on. As an example, the vehicle height adjusting device 200 is applicable to the front fork of a motorcycle or a motor tricycle as a saddle-riding type vehicle on which an occupant straddles. Hereinafter, the vehicle height adjusting device 200 will be described in detail.

The vehicle height adjusting device 200 has an outer tube 201, an inner tube 202 fitted so as to be capable of moving forward and backward with respect to the outer tube 201, a spring 203 provided in the inner tube 202, and a cylinder 204 provided inside the inner tube 202. A piston rod 205 extends from the lower end of the inner tube 202 toward the inside of the cylinder 204, and the piston rod 205 has an end portion to which a piston 206 is connected. In other words, the vehicle height adjusting device 200 has a telescopic configuration in which the inner tube 202 provided on the lower side can be moved forward and backward with respect to the outer tube 201 provided on the upper side. The center line of each of these members is the same center line CL.

The outer tube 201 is a cylindrical member provided on the vehicle body side of a vehicle provided with the vehicle height adjusting device 200. The outer tube 201 extends in the up-down direction, and the upper end of the outer tube 201 is blocked by a lid body 207. The upper end of the outer tube 201 is a closed end, and the lower end of the outer tube 201 is an open end.

The inner tube 202 is a cylindrical member provided on the vehicle wheel side of a vehicle provided with the vehicle height adjusting device 200. The inner tube 202 is fitted to the inside of the outer tube 201 such that a part of the inner tube 202 is capable of moving forward and backward along the center line CL. The lower end of the inner tube 202 is provided on an axle bracket 208 for front wheel axle support and is blocked by a lid body 209. The lower end of the inner tube 202 is a closed end, and the upper end of the inner tube 202 is an open end.

The spring 203 is configured by a compression coil spring positioned in the inner tube 202. The spring 203 applies forces directed away from each other along the center line CL to the outer tube 201 and the inner tube 202.

The cylinder 204 is a cylindrical member extending to the inside of the inner tube 202 from the upper portion of the outer tube 201 and is positioned on the center line CL.

The piston rod 205 is a cylindrical member extending to the inside of the cylinder 204 from the lower end of the inner tube 202.

The piston 206 is connected to the upper end of the piston rod 205 and partitions the inside of the cylinder 204 into a first oil chamber 211 above the piston 206 and a second oil chamber 212 below the piston 206.

The first oil chamber 211 is positioned below the valve device 10. A pump chamber that pressurizes the oil inside during a compression stroke in which the piston 206 moves upward is configured by the first oil chamber 211. Hereinafter, the first oil chamber 211 may be appropriately referred to as "pump chamber 211". A pump 213 is configured by the piston 206 and the pump chamber 211. The vehicle height adjusting device 200 is mounted on a saddle-riding type vehicle such that the pump chamber 211 is positioned below the valve device 10.

The valve device 10 is attached to the lid body 207. More specifically, the housing connecting member 81 of the valve device 10 is fixed by being screwed into the lid body 207. In the housing 80 of the valve device 10, the second end surface 90b is in the pump chamber 211.

Further, the vehicle height adjusting device 200 includes a jack chamber 214 and a reserve chamber 215.

The jack chamber 214 is provided in, for example, the outer peripheral portion of the cylinder 204. The oil that is pressurized by the pump chamber 211 during the compression stroke of the piston 206 is capable of flowing into the jack chamber 214.

The oil in the jack chamber 214 can be stored in the reserve chamber 215, which is capable of returning the oil to the pump chamber 211 and provided between the inner tube 202 and the cylinder 204. The oil stored in the reserve chamber 215 can be returned from the lower end portion of the reserve chamber 215 to the pump chamber 211 via a check valve 216 (one-way valve 216), the hollow piston rod 205, and the communication hole of the piston 206.

The vehicle height adjusting device 200 is capable of changing the vehicle height of a saddle-riding type vehicle using the forward and backward motion of the piston 206.

Next, the communication relationship of the pump chamber 211, the jack chamber 214, and the reserve chamber 215 with respect to the valve device 10 will be described with reference to FIGS. 1 and 11. As described above, the housing 80 includes the first port 93, the second port 94, the first communication hole 95, the second communication hole 96, and the third communication hole 97.

The first port 93 allows the inner portion 92 (storage chamber 92) of the housing 80 and the pump chamber 211 to communicate with each other via the first valve 70. The second port 94 allows the first port 93 and the jack chamber 214 to communicate with each other. The first communication hole 95 allows the inner portion 92 (storage chamber 92) of the housing 80 and the pump chamber 211 to communicate directly with each other. The second communication hole 96 allows the inner portion 92 (storage chamber 92) of the housing 80 and the reserve chamber 215 to communicate with each other. The third communication hole 97 allows the second port 94 and the inner portion 92 (storage chamber 92) of the housing 80 to communicate with each other via the first valve 70.

Next, the action of the vehicle height adjusting device 200 will be described with reference to FIGS. 1, 10, and 11.

During the traveling of a saddle-riding type vehicle, the piston 206 of the vehicle height adjusting device 200 moves upward with respect to the cylinder 204 during each front fork compression stroke. As a result, the oil in the pump chamber 211 is pushed by the piston 206 and the pressure of the oil in the pump chamber 211 rises.

The control unit 140 of the valve device 10 does not energize, for example, the excitation coil 21 of the electromagnetic solenoid 20 (current value I=0) in the first state of increasing the vehicle height during the traveling of the saddle-riding type vehicle. In the first state, the first valve 70 and the second valve 120 are in the closed state. When the pressure of the oil in the pump chamber 211 becomes equal to or higher than a predetermined value by the piston 206 moving upward with respect to the cylinder 204, the pressurized oil passes through the first port 93, opens the first check valve 100, and enters the jack chamber 214 from the second port 94. As a result, the vehicle height adjusting device 200 is extended to increase the vehicle height.

Subsequently, the control unit 140 shifts to the second state of maintaining the vehicle height when it is determined that the height of the traveling vehicle reaches a target value or when it is determined that the vehicle height is to be maintained. In the second state, the excitation coil 21 is supplied with, for example, the first current amount as a small current. As a result, the operating rod 24 moves forward by the first forward and backward movement amount St1 from the first position Q1 as illustrated in FIGS. 2B and 7, the first valve 70 is maintained in the closed state, and the second valve 120 is released. As illustrated in FIGS. 7 and 11, the pressurized oil in the pump chamber 211 enters the storage chamber 92 of the housing 80 from the first communication hole 95, passes through the communication passage 45 from the second valve 120 in the open state, opens the second check valve 130, and enters the reserve chamber 215 from the second communication hole 96. As a result, the vehicle height adjusting device 200 switches from the first state of increasing the vehicle height to the second state of maintaining the vehicle height. As a result, the vehicle height on the occasion of switching to the second state is maintained.

The control unit 140 shifts to the third state of decreasing the vehicle height when, for example, it is determined that the traveling speed of the saddle-riding type vehicle is equal to or less than a predetermined value. In the third state, the excitation coil 21 is supplied with, for example, the second current amount larger than the first current amount. As a result, the operating rod 24 moves forward by the second forward and backward movement amount St2 from the first position Q1 as illustrated in FIGS. 2C and 8 and both the first valve 70 and the second valve 120 are released. As illustrated in FIGS. 8 and 11, in the third state, the oil in the jack chamber 214 passes through the valve chamber 101 of the first check valve 100 and the third communication hole 97 from the second port 94, enters the storage chamber 92 of the housing 80 from the first valve 70 in the open state, passes through the communication passage 45 from the second valve 120 in the open state, opens the second check valve 130, and enters the reserve chamber 215 from the second communication hole 96. The vehicle height decreases as a result.

The minute air that is contained in the oil in the pump chamber 211 is lower in specific gravity than the oil, and thus a so-called air accumulation phenomenon may occur in which the air is gradually separated and accumulated in the upper portion of the pump chamber 211 or in the storage chamber 92 of the housing 80. It is preferable to eliminate the accumulated air from the viewpoint of, for example, reaching a state where the performance of the pump 213 can be exhibited sufficiently.

As described above, the control unit 140 of the valve device 10 intermittently supplies a small current (first current amount) to the excitation coil 21 only for a certain preset time at preset regular intervals. As a result, the operating rod 24 is switched to the second state, the second valve 120 is opened, and thus the oil and the air in the storage chamber 92 as an inner portion in the housing 80 are capable of reaching the communication passage 95. After flowing into the communication passage 95, the oil and the air push-open the second valve 120 to reach the second communication hole 96 and flow into the reserve chamber 215.

The reserve chamber 215 is outside the valve device 10. Accordingly, as a result of a switch from the first state to the second state, the air inside the valve device 10 can be discharged to the outside of the valve device 10. As a result, it is possible to improve the air accumulation phenomenon in which air is accumulated in the upper portion of the pump chamber 211 or in the storage chamber 92 of the housing 80. As a result, it is possible to reach a state where the performance of the pump 213 can be exhibited sufficiently. In addition, the form of intermittently switching from the first state of increasing the vehicle height to the second state of maintaining the vehicle height affects riding comfort less than another form such as a switch from the first state of increasing the vehicle height to the third state of decreasing the vehicle height. Accordingly, by intermittently switching from the first state of increasing the vehicle height to the second state of maintaining the vehicle height, it is possible to improve the air accumulation phenomenon while suppressing riding comfort being affected.

The description of Embodiment 3 is summarized as follows.

The vehicle height adjusting device 200 has the valve device 10, the outer tube 201 having closed upper and open lower ends, and the inner tube 202 having open upper and closed lower ends and fitted to the inside of the outer tube 201 so as to be capable of moving forward and backward in part. The vehicle height adjusting device 200 further has the cylinder 204 extending to the inside of the inner tube 202 from the upper portion of the outer tube 201, the cylindrical piston rod 205 extending to the inside of the cylinder 204 from the lower end of the inner tube 202, and the piston 206 connected to the upper end of the piston rod 205. The piston 206 partitions the inside of the cylinder 204 into the first oil chamber 211 on the upper side and the second oil chamber 212 on the lower side. The first oil chamber 211 is positioned below the valve device 10. The pump chamber 211 that pressurizes the oil inside during the compression stroke of the piston 206 is configured by the first oil chamber 211. The vehicle height adjusting device 200 further includes the jack chamber 214 into which the oil pressurized by the pump chamber 211 during the compression stroke is capable of flowing and the reserve chamber 215 into which the oil in the jack chamber 214 is capable of flowing and by which oil can be returned to the pump chamber 211. The housing 80 of the valve device 10 has the first port 93 that allows the storage chamber 92 as an inner portion of the housing 80 and the pump chamber 211 to communicate with each other via the first valve 70, the second port 94 that allows the first port 93 and the jack chamber 214 to communicate with each other, and the first communication hole 95 that allows the storage chamber 92 as an inner portion of the housing 80 and the pump chamber 211 to communicate directly with each other. The housing 80 of the valve device 10 further includes the second communication hole 96 that allows the storage chamber 92 as an inner portion of the housing 80 and the reserve chamber 215 to communicate with each other and the third communication hole 97 that allows the second port 94 and the storage chamber 92 as an inner portion of the housing 80 to communicate with each other via the first valve 70.

Accordingly, by switching the operating rod 24 between the first state and the second state, it is possible to provide the vehicle height adjusting device 200 having the following two functions.

The first function is to maintain the height of a vehicle at a certain preset height.

The second function is to improve the air accumulation phenomenon in the upper portion of the pump chamber 211 or the storage chamber 92 of the housing 80 by very temporarily and intermittently releasing the second valve 120 at regular intervals.

The valve devices 10 and 10A according to the present invention are not limited to the embodiments insofar as the valve devices 10 and 10A exhibit the actions and effects of the present invention.

For example, the valve device 10A of Embodiment 2 can be applied to a vehicle height adjusting device in the same manner as the valve device 10 of Embodiment 1.

The valve devices 10 and 10A are not limited to the form of application to the vehicle height adjusting device 200.

In addition, the plate-shaped member 50 and the second push member 60 are inessential and the first valve 70 may be directly opened and closed by the first push member 30.

The check valve 130 (one-way valve 130) is also inessential.

INDUSTRIAL APPLICABILITY

The valve devices 10 and 10A of the present invention are suitable for use in a vehicle height adjusting device for a saddle-riding type vehicle with two or three vehicle wheels.

REFERENCE SIGNS LIST 10, 10A valve device
20 operating portion (electromagnetic solenoid)
21 excitation coil
24 operating rod
24a tip portion
30 first push member (push member)
32b extending surface
50 plate-shaped member
60 second push member
66 first application member (first spring)
70 first valve
80 housing
120, 120A second valve
121 valve body
122 second application member (second spring)
140 control unit
200 vehicle height adjusting device
201 outer tube
202 inner tube
204 cylinder
205 piston rod
206 piston
211 first oil chamber (pump chamber)
212 second oil chamber
214 jack chamber
215 reserve chamber
CL center line of operating rod (axial center)
Q1 first position Q2 second position
Q3 third position
St1 first forward and backward movement amount
St2 second forward and backward movement amount

The invention claimed is:
1. A valve device comprising:
an operating portion including an operating rod switchable between a first state where the operating rod is at a first position where the operating rod is retracted most, a second state where the operating rod is displaced from the first position by a preset first forward and backward movement amount, and a third state where the operating rod is displaced from the first position by a second forward and backward movement amount larger than the first forward and backward movement amount;
a push member that can advance by the same amount of forward and backward movement and in the same direction as the operating rod by being pushed by the operating rod;
a first valve that can be opened and closed in accordance with the amount of displacement of the operating rod and the push member from the first position;
a housing storing the first valve;
a second valve that can open and close a communication passage allowing communication inside and outside the housing by switching operation of the operating rod so as to switch from the first state to the second state;
a first application member applying a force directed toward the operating rod to the push member; and
a second application member applying a force directed away from the operating rod to the push member, wherein
a first application force as a force applied to the push member by the first application member is larger than a second application force as a force applied to the push member by the second application member, and
the second valve blocks the communication passage in the first state by receiving a force as a difference between the first application force and the second application force and opens the communication passage by switching the operating rod from the first state to the second state or the third state.

2. The valve device according to claim 1,
wherein the operating portion is configured by an electromagnetic solenoid provided with an excitation coil driving an operating rod to move forward and backward,
wherein the valve device further includes a control unit controlling the excitation coil, and
wherein when the operating rod is in the first state, the control unit controls operation of the operating portion so as to change an excitation state of the excitation coil only for a certain preset time such that the operating rod is switched to the second state at preset regular intervals.

3. A vehicle height adjusting device equipped with a valve device according to claim 2, comprising:
an outer tube having a closed upper end and an open lower end;
an inner tube having an open upper end and a closed lower end, a part of the inner tube being fitted to the inside of the outer tube so as to be capable of moving forward and backward;
a cylinder extending to the inside of the inner tube from an upper portion of the outer tube;
a cylindrical piston rod extending to the inside of the cylinder from the lower end of the inner tube; and
a piston connected to an upper end of the piston rod and partitioning the inside of the cylinder into a first oil chamber on an upper side and a second oil chamber on a lower side,
wherein the first oil chamber is positioned below the valve device and configures a pump chamber pressurizing oil inside during a compression stroke,
wherein the vehicle height adjusting device includes:
a jack chamber into which oil pressurized by the pump chamber during the compression stroke is capable of flowing; and
a reserve chamber into which oil in the jack chamber is capable of flowing and by which oil can be returned to the pump chamber,
and wherein the housing of the valve device includes:
a first port allowing an inner portion of the housing and the pump chamber to communicate with each other via the first valve;
a second port allowing the first port and the jack chamber to communicate with each other;
a first communication hole allowing the inner portion of the housing and the pump chamber to communicate directly with each other;
a second communication hole allowing the inner portion of the housing and the reserve chamber to communicate with each other; and
a third communication hole allowing the second port and the inner portion of the housing to communicate with each other via the first valve.

4. A vehicle height adjusting device equipped with a valve device according to claim 1, comprising:
an outer tube having a closed upper end and an open lower end;
an inner tube having an open upper end and a closed lower end, a part of the inner tube being fitted to the inside of the outer tube so as to be capable of moving forward and backward;
a cylinder extending to the inside of the inner tube from an upper portion of the outer tube;
a cylindrical piston rod extending to the inside of the cylinder from the lower end of the inner tube; and
a piston connected to an upper end of the piston rod and partitioning the inside of the cylinder into a first oil chamber on an upper side and a second oil chamber on a lower side,
wherein the first oil chamber is positioned below the valve device and configures a pump chamber pressurizing oil inside during a compression stroke,
wherein the vehicle height adjusting device includes:
a jack chamber into which oil pressurized by the pump chamber during the compression stroke is capable of flowing; and
a reserve chamber into which oil in the jack chamber is capable of flowing and by which oil can be returned to the pump chamber,
and wherein the housing of the valve device includes:
a first port allowing an inner portion of the housing and the pump chamber to communicate with each other via the first valve;
a second port allowing the first port and the jack chamber to communicate with each other;
a first communication hole allowing the inner portion of the housing and the pump chamber to communicate directly with each other;

a second communication hole allowing the inner portion of the housing and the reserve chamber to communicate with each other; and a third communication hole allowing the second port and the inner portion of the housing to communicate with each other via the first valve.

5. A valve device comprising:

an operating portion including an operating rod switchable between a first state where the operating rod is at a first position where the operating rod is retracted most, a second state where the operating rod is displaced from the first position by a preset first forward and backward movement amount, and a third state where the operating rod is displaced from the first position by a second forward and backward movement amount larger than the first forward and backward movement amount;

a push member that can advance by the same amount of forward and backward movement and in the same direction as the operating rod by being pushed by the operating rod;

a first valve that can be opened and closed in accordance with the amount of displacement of the operating rod and the push member from the first position;

a housing storing the first valve;

a second valve that can open and close a communication passage allowing communication inside and outside the housing by switching operation of the operating rod so as to switch from the first state to the second state;

a first application member applying a force directed toward the push member to the operating rod; and a second application member applying a force directed away from the push member to the operating rod, wherein a first application force as a force applied to the operating rod by the first application member is larger than a second application force as a force applied to the operating rod by the second application member, and the second valve opens the communication passage in the first state by receiving a force as a difference between the first application force and the second application force and blocks the communication passage by switching the operating rod from the first state to the second state or the third state.

6. The valve device according to claim 5, wherein the operating portion is configured by an electromagnetic solenoid provided with an excitation coil driving an operating rod to move forward and backward, wherein the valve device further includes a control unit controlling the excitation coil, and wherein when the operating rod is in the first state, the control unit controls operation of the operating portion so as to change an excitation state of the excitation coil only for a certain preset time such that the operating rod is switched to the second state at preset regular intervals.

7. A vehicle height adjusting device equipped with a valve device according to claim 6, comprising:

an outer tube having a closed upper end and an open lower end;

an inner tube having an open upper end and a closed lower end, a part of the inner tube being fitted to the inside of the outer tube so as to be capable of moving forward and backward;

a cylinder extending to the inside of the inner tube from an upper portion of the outer tube;

a cylindrical piston rod extending to the inside of the cylinder from the lower end of the inner tube; and a piston connected to an upper end of the piston rod and partitioning the inside of the cylinder into a first oil chamber on an upper side and a second oil chamber on a lower side, wherein the first oil chamber is positioned below the valve device and configures a pump chamber pressurizing oil inside during a compression stroke, wherein the vehicle height adjusting device includes:

a jack chamber into which oil pressurized by the pump chamber during the compression stroke is capable of flowing; and a reserve chamber into which oil in the jack chamber is capable of flowing and by which oil can be returned to the pump chamber, and wherein the housing of the valve device includes:

a first port allowing an inner portion of the housing and the pump chamber to communicate with each other via the first valve;

a second port allowing the first port and the jack chamber to communicate with each other;

a first communication hole allowing the inner portion of the housing and the pump chamber to communicate directly with each other;

a second communication hole allowing the inner portion of the housing and the reserve chamber to communicate with each other; and a third communication hole allowing the second port and the inner portion of the housing to communicate with each other via the first valve.

8. A vehicle height adjusting device equipped with a valve device according to claim 5, comprising:

an outer tube having a closed upper end and an open lower end;

an inner tube having an open upper end and a closed lower end, a part of the inner tube being fitted to the inside of the outer tube so as to be capable of moving forward and backward;

a cylinder extending to the inside of the inner tube from an upper portion of the outer tube;

a cylindrical piston rod extending to the inside of the cylinder from the lower end of the inner tube; and a piston connected to an upper end of the piston rod and partitioning the inside of the cylinder into a first oil chamber on an upper side and a second oil chamber on a lower side, wherein the first oil chamber is positioned below the valve device and configures a pump chamber pressurizing oil inside during a compression stroke, wherein the vehicle height adjusting device includes:

a jack chamber into which oil pressurized by the pump chamber during the compression stroke is capable of flowing; and a reserve chamber into which oil in the jack chamber is capable of flowing and by which oil can be returned to the pump chamber, and wherein the housing of the valve device includes:

a first port allowing an inner portion of the housing and the pump chamber to communicate with each other via the first valve;

a second port allowing the first port and the jack chamber to communicate with each other;

a first communication hole allowing the inner portion of the housing and the pump chamber to communicate directly with each other;

a second communication hole allowing the inner portion of the housing and the reserve chamber to communicate with each other; and a third communication hole allowing the second port and the inner portion of the housing to communicate with each other via the first valve.

9. A vehicle height adjusting device equipped with a valve device, said valve device comprising:

an operating portion including an operating rod switchable between a first state where the operating rod is at a first position where the operating rod is retracted most, a second state where the operating rod is displaced from the first position by a preset first forward and backward movement amount, and a third state where the operating rod is displaced from the first position by a second forward and backward movement amount larger than the first forward and backward movement amount;

a push member that can advance by the same amount of forward and backward movement and in the same direction as the operating rod by being pushed by the operating rod;

a first valve that can be opened and closed in accordance with the amount of displacement of the operating rod and the push member from the first position;

a housing storing the first valve; and a second valve that can open and close a communication passage allowing communication inside and outside the housing by switching operation of the operating rod so as to switch from the first state to the second state, said vehicle height adjusting device comprising:

an outer tube having a closed upper end and an open lower end;

an inner tube having an open upper end and a closed lower end, a part of the inner tube being fitted to the inside of the outer tube so as to be capable of moving forward and backward;

a cylinder extending to the inside of the inner tube from an upper portion of the outer tube;

a cylindrical piston rod extending to the inside of the cylinder from the lower end of the inner tube; and a piston connected to an upper end of the piston rod and partitioning the inside of the cylinder into a first oil chamber on an upper side and a second oil chamber on a lower side, wherein the first oil chamber is positioned below the valve device and configures a pump chamber pressurizing oil inside during a compression stroke, wherein the vehicle height adjusting device includes:

a jack chamber into which oil pressurized by the pump chamber during the compression stroke is capable of flowing; and a reserve chamber into which oil in the jack chamber is capable of flowing and by which oil can be returned to the pump chamber, and wherein the housing of the valve device includes:

a first port allowing an inner portion of the housing and the pump chamber to communicate with each other via the first valve;

a second port allowing the first port and the jack chamber to communicate with each other;

a first communication hole allowing the inner portion of the housing and the pump chamber to communicate directly with each other;

a second communication hole allowing the inner portion of the housing and the reserve chamber to communicate with each other; and a third communication hole allowing the second port and the inner portion of the housing to communicate with each other via the first valve.

* * * * *